(12) United States Patent
Baek et al.

(10) Patent No.: US 10,425,861 B2
(45) Date of Patent: Sep. 24, 2019

(54) METHOD AND APPARATUS FOR PREVENTING LOSS OF DATA PACKETS

(71) Applicant: Samsung Electronics Co., Ltd., Suwon-si, Gyeonggi-do (KR)

(72) Inventors: Sangkyu Baek, Yongin-si (KR); Hyunjeong Kang, Seoul (KR); Beomsik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 15/421,850

(22) Filed: Feb. 1, 2017

(65) Prior Publication Data

US 2017/0230873 A1 Aug. 10, 2017

(30) Foreign Application Priority Data

Feb. 4, 2016 (KR) .................. 10-2016-0014453
Mar. 29, 2016 (KR) .................. 10-2016-0037989

(51) Int. Cl.
*H04W 36/00* (2009.01)
*H04W 84/04* (2009.01)
*H04W 36/14* (2009.01)

(52) U.S. Cl.
CPC ........ *H04W 36/0011* (2013.01); *H04W 36/14* (2013.01); *H04W 84/042* (2013.01)

(58) Field of Classification Search
CPC .............. H04W 36/0011; H04W 36/14; H04W 84/042
See application file for complete search history.

(56) References Cited

U.S. PATENT DOCUMENTS

2012/0155351 A1 6/2012 Lee et al.
2014/0287753 A1* 9/2014 Schulist ............ H04W 36/0022
455/436

(Continued)

FOREIGN PATENT DOCUMENTS

KR 10-2015-0117893 A 10/2015
WO 2015/030557 A1 3/2015

OTHER PUBLICATIONS

International Search Report dated May 22, 2017, issued in the International Application No. PCT/KR2017/001067.

*Primary Examiner* — Bo Hui A Zhu
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A method for preventing a loss of data packets of a transmission end is provided. The method includes performing a path switching operation, receiving, from a reception end, a switching status report that includes information related to the data packets that were not received by the reception end, and retransmitting the data packets that were not received by the reception end, where the path switching operation is an operation of switching a data transmission path from a first communication system to a second communication system or from the second communication system to the first communication system, and where the first communication system is a fourth generation (4G) communication system, and the second communication system is a fifth generation (5G) communication system that uses a millimeter-wave (mm-wave) band.

16 Claims, 27 Drawing Sheets

(56) References Cited

U.S. PATENT DOCUMENTS

| | | |
|---|---|---|
| 2015/0162961 A1 | 6/2015 | Jalloul et al. |
| 2015/0208286 A1 | 7/2015 | Ozturk et al. |
| 2016/0198518 A1 | 7/2016 | Baek et al. |
| 2017/0041842 A1 | 2/2017 | Yoon et al. |
| 2017/0244619 A1* | 8/2017 | Bhatia .................... H04L 43/08 |
| 2018/0091264 A1* | 3/2018 | Laselva ................ H04L 1/1854 |

* cited by examiner

METHOD AND APPARATUS FOR PREVENTING LOSS OF DATA PACKETS

CROSS-REFERENCE TO RELATED APPLICATION(S)

This application claims the benefit under 35 U.S.C. § 119(a) of a Korean patent application filed on Feb. 4, 2016 in the Korean Intellectual Property Office and assigned Serial number 10-2016-0014453, and of a Korean patent application filed on Mar. 29, 2016 in the Korean Intellectual Property Office and assigned Serial number 10-2016-0037989, the entire disclosure of each of which is hereby incorporated by reference.

TECHNICAL FIELD

The present disclosure relates to the function of a fifth generation (5G) mobile communication system. More particularly, the present disclosure relates to communication devices that support two or more general communication systems.

BACKGROUND

In order to meet the wireless data traffic demand that is on an increasing trend after commercialization of fourth generation (4G) communication system, efforts for developing improved fifth generation (5G) communication system or pre-5G communication system have been made. For this reason, the 5G communication system or pre-5G communication system has been called beyond 4G network communication system or post long term evolution (LTE) system.

In order to achieve high data rate, implementation of 5G communication system in a millimeter wave (mmwave) band (e.g., like 60 GHz band) has been considered. In order to mitigate a radio wave path loss and to increase a radio wave transmission distance in the mmwave band, technologies of beam-forming, massive multiple input and multiple output (MIMO), full dimension MIMO (FD-MIMO), analog beam-forming, and large scale antenna for the 5G communication system have been discussed.

Further, for system network improvement in the 5G communication system, technology developments have been made for an evolved small cell, improved small cell, cloud radio access network (cloud RAN), ultra-dense network, device to device communication (D2D), wireless backhaul, moving network, cooperative communication, coordinated multi-points (CoMP), and reception interference cancellation.

In addition, hybrid frequency shift keying (FSK) and quadrature amplitude modulation (QAM) modulation (FQAM) and sliding window superposition coding (SWSC), which correspond to advanced coding modulation (ACM) system, and filter bank multi carrier (FBMC), non-orthogonal multiple access (NOMA), and sparse code multiple access (SCMA), which correspond to advanced connection technology, have been developed in the 5G system.

The above information is presented as background information only to assist with an understanding of the present disclosure. No determination has been made, and no assertion is made, as to whether any of the above might be applicable as prior art with regard to the present disclosure.

SUMMARY

In a primary deployment scenario of a fifth generation (5G) mobile communication network, however, a scenario that is based on interlocking with the existing fourth generation (4G) communication system is included. In this case, if it is difficult to correct a 4G communication terminal modem of a 4G communication device, a method and an apparatus for preventing a loss of data packets and reordering the sequence thereof are required to switch or split data paths between communication devices of different generations.

Aspects of the present disclosure are to address at least the above-mentioned problems and/or disadvantages and to provide at least the advantages described below. Accordingly, an aspect of the present disclosure is to provide an apparatus and method for preventing a loss of data packets and reordering the sequence thereof to switch or split data paths between communication devices of different generations.

In accordance with an aspect of the present disclosure, a method for preventing a loss of data packets of a transmission end is provided. The method includes performing a path switching operation, receiving, from a reception end, a switching status report that includes information related to the data packets that were not received by the reception end, and retransmitting the data packets that were not received by the reception end, wherein the path switching operation is an operation of switching a data transmission path from a first communication system to a second communication system or from the second communication system to the first communication system, and wherein the first communication system is a fourth generation (4G) communication system, and the second communication system is a fifth generation (5G) communication system that uses a millimeter-wave (mm-wave) band.

In accordance with another aspect of the present disclosure, a method for preventing a loss of data packets of a reception end is provided. The method includes performing a path switching operation, transmitting, to a transmission end, a switching status report that includes information related to the data packets that were not received by the reception end, and re-receiving the data packets that were not received, wherein the path switching operation is an operation of switching a data transmission path from a first communication system to a second communication system or from the second communication system to the first communication system, and wherein the first communication system is a fourth generation (4G) communication system, and the second communication system is a fifth generation (5G) communication system that uses a millimeter-wave (mm-wave) band.

In accordance with still another aspect of the present disclosure, a transmission end apparatus for preventing a loss of data packets is provided. The transmission end apparatus includes a transceiver configured to transmit and receive signals with a reception end apparatus and at least one processor configured to perform a path switching operation, receive, from the reception end apparatus, a switching status report that includes information related to the data packets that were not received by the reception end apparatus, and retransmit the data packets that were not received by the reception end apparatus, wherein the path switching operation is an operation of switching a data transmission path from a first communication system to a second communication system or from the second communication system to the first communication system, and wherein the first communication system is a fourth generation (4G) communication system, and the second communication system is a fifth generation (5G) communication system that uses a millimeter-wave (mm-wave) band.

In accordance with yet still another aspect of the present disclosure, a reception end apparatus for preventing a loss of data packets is provided. The reception end apparatus includes a transceiver configured to transmit and receive signals with a transmission end apparatus and at least one processor configured to perform a path switching operation, transmit, to the transmission end apparatus, a switching status report that includes information related to the data packets that were not received by the reception end apparatus, and re-receive the data packets that were not received, wherein the path switching operation is an operation of switching a data transmission path from a first communication system to a second communication system or from the second communication system to the first communication system, and wherein the first communication system is a fourth generation (4G) communication system, and the second communication system is a fifth generation (5G) communication system that uses a millimeter-wave (mm-wave) band.

Here, as an example, if the data packets are downlink data packets, the transmission end is a base station and the reception end is a terminal, and if the data packets are uplink data packets, the transmission end is the terminal and the reception end is the base station.

According to the various embodiments of the present disclosure, it is possible to perform lossless data transmission even in the case of data path switching and data path splitting in an environment in which two different kinds of communication systems coexist.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
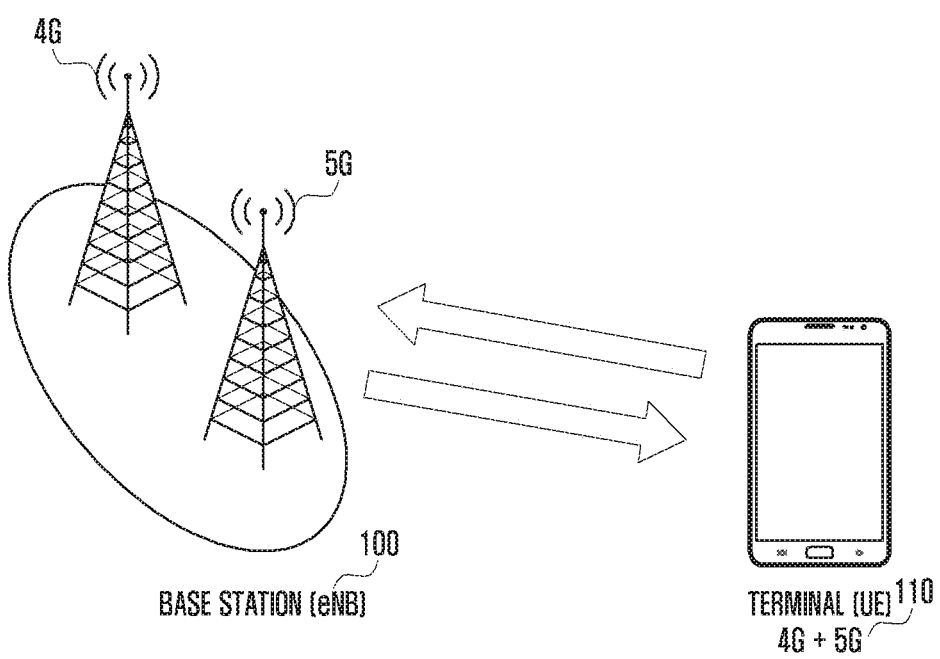
FIG. 1 is a diagram illustrating devices that constitute a scenario according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Further, in describing various embodiments of the present disclosure in detail, although the main objects would be a fourth generation (4G) mobile communication system and a fifth generation (5G) mobile communication system, the main subject of the present disclosure can be applied to other communication systems adopting similar technical backgrounds and channel types with slight modifications within a range that does not greatly deviate from the scope of the present disclosure, and this would be possible according to the judgment of a person skilled in the art to which the present disclosure pertains.

The aspects and features of the present disclosure and methods for achieving the aspects and features will be apparent by referring to the various embodiments to be described in detail with reference to the accompanying drawings. However, the present disclosure is not limited to the various embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

As technology in the related art, there exist 4G mobile communication technology and 5G mobile communication technology. The 4G mobile communication technology is technology capable of operating in a frequency band that is equal to or lower than 6 GHz on the basis of orthogonal frequency-division multiple access (OFDMA) and single carrier FDMA (SC-FDMA). The 5G communication technology in the related art may be divided into "Above 6 GHz" technology that operates in a millimeter-wave (mm-wave) band that is equal to or higher than 6 GHz and "Below 6 GHz" technology that operates in an operation frequency band of the 4G mobile communication that is equal to or lower than 6 GHz.

A main deployment scenario of a 5G mobile communication network includes a scenario that is based on interlocking with the existing 4G communication system. In this case, since it is difficult to correct the 4G technology standard and related devices, it is preferred to minimize correction of the existing 4G communication system. In such a situation, if it is difficult to correct a 4G communication device, and in particular, a 4G communication terminal modem thereof, it becomes difficult to prevent a loss of data packets and to perform sequence redeployment in switching or splitting data paths between communication devices having different generations.

According to the present disclosure, it is possible to achieve lossless data transmission in the case where a data communication path is switched between different systems in a scenario where the 5G communication system and the 4G communication system coexist or data packets are split and transmitted to different systems (e.g., in the case where a part of data packets is transmitted through the 5G communication technology and the remainder thereof is transmitted through the 4G communication technology). The present disclosure may be equally applied to perform the lossless data transmission in the case where the data communication path is switched between the different systems in the scenario where the 5G communication system and the 4G communication system coexist in the upper concept, or the data packets are split and transmitted to the different systems.

FIG. 1 is a diagram illustrating devices that constitute a scenario according to an embodiment of the present disclosure.

Referring to FIG. 1, the present disclosure relates to mobile communications or cellular communications, and assumes an environment in which one or more base stations (eNBs) for the mobile communications and one or more terminals (UEs) are provided. Further, the present disclosure assumes base stations and terminals that support communications using two different kinds of communication systems. For example, base stations 100 and terminals 110 that respectively support the 4G mobile communication technology and the 5G mobile communication technology may be exemplified. As described above, the 5G mobile communication technology may be one of the "Above 6 GHz" technology and the "Below 6 GHz" technology. In the description of the present disclosure, for convenience in understanding, the 4G and 5G communication systems will be described, but essentially, there is no limit in communication technology used in the present disclosure.

In the environment where the two kinds of communication technologies coexist as described above, it may be difficult to exchange internal information between communication devices that support different communication systems due to several technical limitations including backward compatibility. As an example, it may be difficult to transfer lately used sequence number (SN) information to the coexisting 5G network at a specific time of a specific radio bearer (RB) in a 4G long term evolution (LTE) communication system. In order to transfer such internal information between the communication devices, it is required that an interface exists between communication technologies in the communication devices, and for this, correction of the communication device is required.

In the present disclosure, it is assumed that the communication devices in the base station can exchange the internal information between the different communication technologies through correction of the base station device. However, it is assumed that the terminal cannot exchange the internal information between the communication technologies. As an example, a terminal that supports both the 4G communication network and the 5G communication network cannot transfer the internal information including packet data convergence protocol (PDCP) SN of the 4G communication device to the 5G communication device of the terminal. In the same manner, the internal information including the PDCP SN of the 5G communication device cannot be transferred to the 4G communication device.

Figure 2:
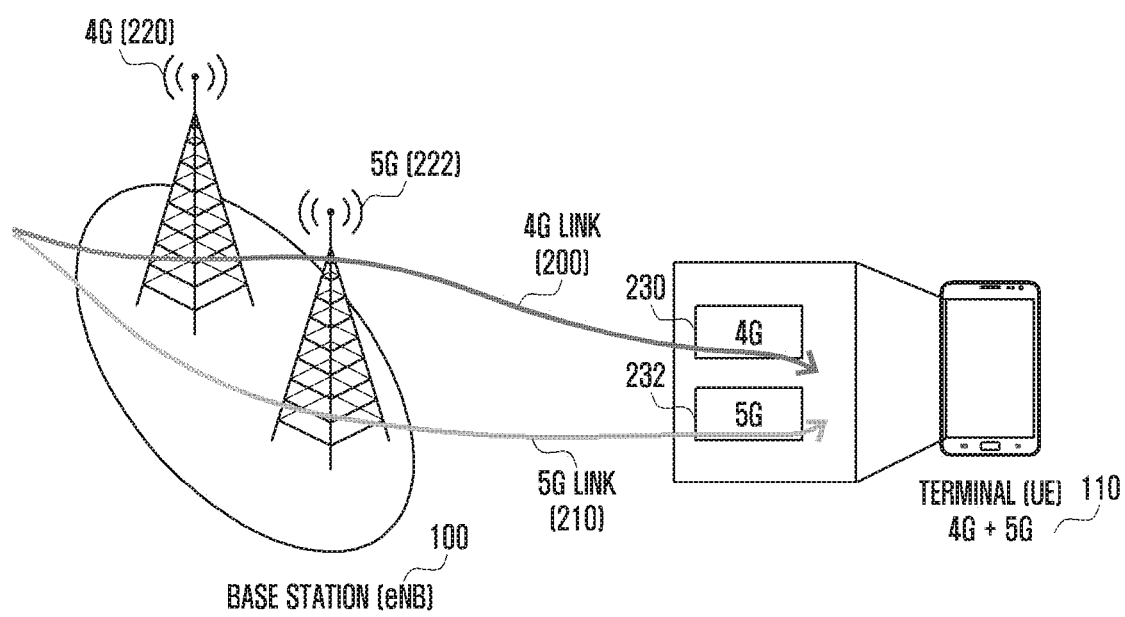
FIG. 2 is a diagram illustrating an example of downlink traffic in a scenario according to an embodiment of the present disclosure.

FIG. 2 is a diagram illustrating an example of downlink traffic in a scenario according to an embodiment of the present disclosure.

Referring to FIG. 2, downlink traffic that is transmitted from a base station to a terminal may be transferred to the terminal through transmission of the downlink traffic to a 4G terminal device 230 of the terminal through a 4G base station device 220 in the base station. This is called a 4G link 200. Further, downlink traffic that is transmitted from the base station to the terminal may be transferred to the terminal through transmission of the downlink traffic to a 5G terminal device 232 of the terminal through a 5G base station device 222 in the base station according to the present disclosure. This is called a 5G link 210. According to various embodiments, the base station and the terminal that have both the 4G communication device and the 5G communication device may be respectively called a 5G base station and a 5G terminal in the wide concept. Further, such a 5G base station and a 5G terminal may be called 5G communication devices in the upper concept.

Communications may be performed using only one of the 4G link and the 5G link at the specific time according to support capability of the base station or the terminal or a protocol of the communication network. In this case, a situation, in which the communications are performed through the 4G link, and then the communication link is switched from the 4G link to the 5G link, or a situation, in which the communications are performed through the 5G link, and then the communication link is switched from the 5G link to the 4G link on the contrary, may be considered. Such a situation is called "data path switching". Further, the communications may be simultaneously performed using both the 4G link and the 5G link according to the support capability of the base station or the terminal or the protocol of the communication network. Such a situation is called "data path splitting".

The present disclosure proposes a method for securing lossless data transmission in the data path switching and data path splitting scenario. As previously assumed, the 4G communication device and the 5G communication device of the terminal cannot mutually exchange the internal information, such as PDCP SN. However, the base station can know and control the internal information between the 5G and 4G base station communication devices through the protocol and the device correction. It is not required to perform the internal information exchange and control between the communication systems with respect to all kinds of information and settings, but the internal information exchange and control may be minimally performed only with respect to those that are required to operate the communication network.

Further, in the case of uplink traffic, explanation may be made in the same manner as the downlink traffic except for a different point that the direction of traffic is changed from the terminal to the base station.

Figure 3:
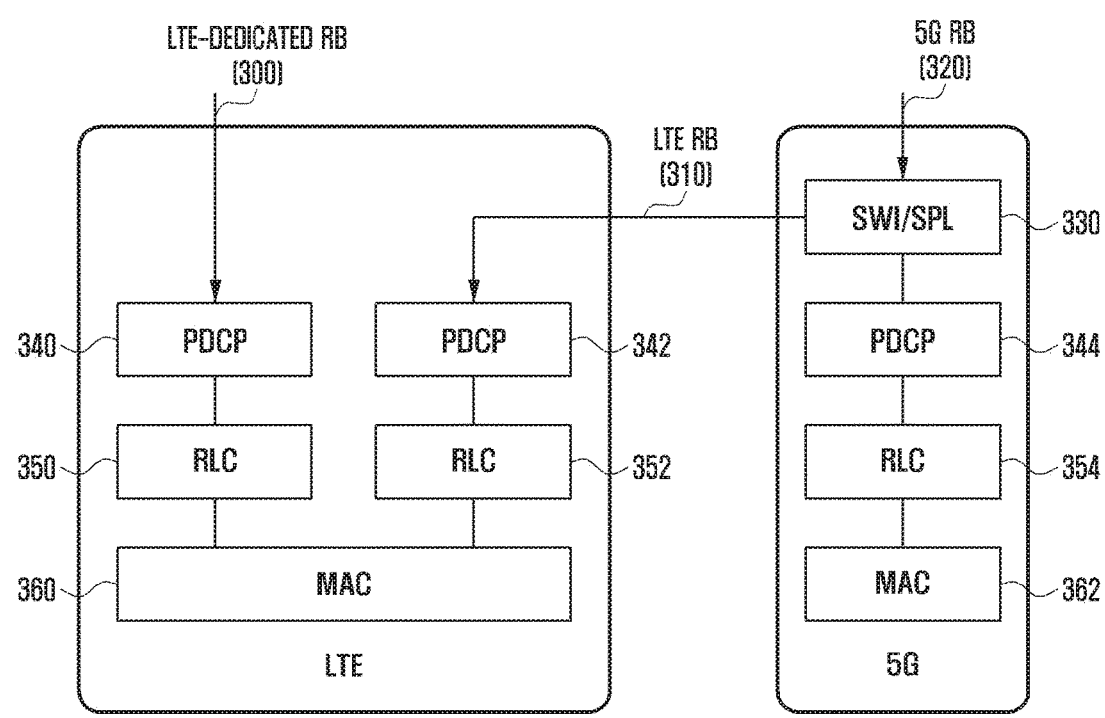
FIG. 3 is a diagram illustrating a simple protocol stack of a base station and a terminal that constitute according to an embodiment of the present disclosure.

FIG. 3 is a diagram illustrating a simple protocol stack of a base station and a terminal that constitute according to an embodiment of the present disclosure.

Referring to FIG. 3, an environment is assumed, in which an LTE that is a kind of 4G mobile communication technology and 5G communication technology coexist. FIG. 3 illustrates one LTE-dedicated RB 300, an LTE RB 310 connected through 5G switching (SWI)/splitting (SPL) sublayer or function (hereinafter referred to as "SWI/SPL"), and a 5G RB 320 connected through 5G SWI/SPL sublayer or function. The LTE RB 310 and the 5G RB 320 that are connected through the SWI/SPL may be one of a data RB (DRB) and a signaling RB (SRB). The SWI/SPL may be operated in the form of a sublayer or function, and may perform one or more roles of path switching and path splitting. The SWI/SPL of a reception end transmits data packets that have come through the LTE or 5G path to an upper layer to match the transmission sequence.

Although the LTE RB 310 and the 5G RB 320 that are branched from the SWI/SPL according to the setting and technology definition may be called one 5G RB, the LTE RB 310 is recognized only as an LTE RB, such as the LTE-dedicated RB 300, from the side of an LTE communication device, and the upper connection thereof becomes only the SWI/SPL. In the wide concept, an LTE protocol stack and a 5G protocol stack, which interlock with each other according to the above embodiment, may be called a 5G protocol stack.

However, the scope of the present disclosure is not limited in a manner that the SWI/SPL layer or function should be surely located at an upper end of the 5G stack, and the contents to be described in the present disclosure are applied as they are in the case where the SWI/SPL layer or function is located at one portion of an upper end of the LTE RB or the 5G RB. In addition, the contents to be described in the present disclosure can be applied as they are even in the case where the SWI/SPL layer 330 or function is located at a third position other than the upper end of the LTE RB or the 5G RB. In FIG. 3, a two-layer structure that is defined by the 3rd generation partnership project (3GPP) of PDCP (340, 342, 344), radio link control (RLC) (350, 352, 354), and medium access control (MAC) (360, 362) is assumed. However, the present disclosure is not limited even in other layer structures so far as it has functions that are required in the present disclosure. For convenience, in the present disclosure, it is described that both the 4G and the 5G have the two-layer structure of the 3GPP.

Figure 4:
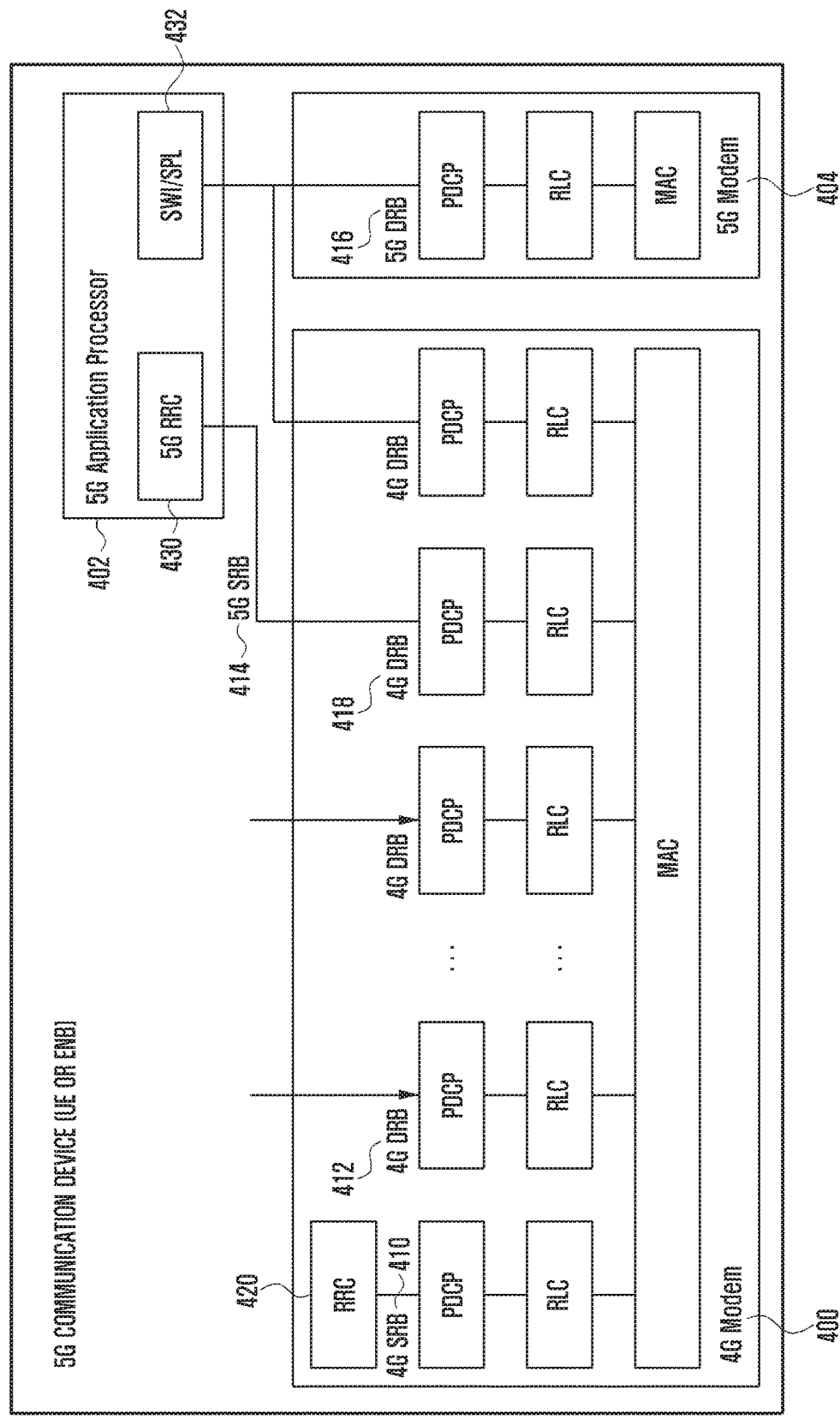
FIG. 4 is a diagram illustrating an example of a detailed device configuration that can carry out according to an embodiment of the present disclosure.

FIG. 4 is a diagram illustrating an example of a detailed device configuration that can carry out according to an embodiment of the present disclosure.

Referring to FIG. 4, a 5G communication device includes a 4G modem 400, a 5G modem 404, and a 5G application processor (AP) 402. However, the 5G communication device may be configured to include other devices including an antenna module. In the present disclosure, devices of which explanation is not necessary will be omitted, but this does not mean that the other devices are not included in the 5G communication device.

In the 5G communication device in the wide meaning, an LTE modem that is composed of one or more SRBs and one or more DRBs may exist in the 4G modem 400. A 4G SRB 410 is connected to a radio resource control (RRC) sublayer (hereinafter referred to as "RRC") 420 that controls the 4G link, and serves to transfer data traffic that is generated in an upper layer. A plurality of DRBs may exist, and according to 5G coexistence scenario, parts of DRBs may independently operate as 4G, while other DRBs may be connected to a 5G RRC 430 or a SWI/SPL 432. The 5G RRC 430 serves to transfer a control message of a 5G communication system. For stable transmission, the control message that is transmitted by the 5G RRC 430 may be encapsulated and transmitted using a 4G DRB 418. The SWI/SPL 432 performs path switching or splitting of 5G data as described above with reference to FIG. 3. The SWI/SPL 432 may transmit the arriving data packets to a 4G DRB or 5G DRB 416 that is previously connected thereto. In the embodiment of FIG. 4, it is assumed that the 5G RRC and the 5G SWI/SPL are located at the AP 402 of the 5G communication device, and it is exemplified that one 5G RB (SRB or DRB) corresponds to one 4G DRB.

Figure 5:
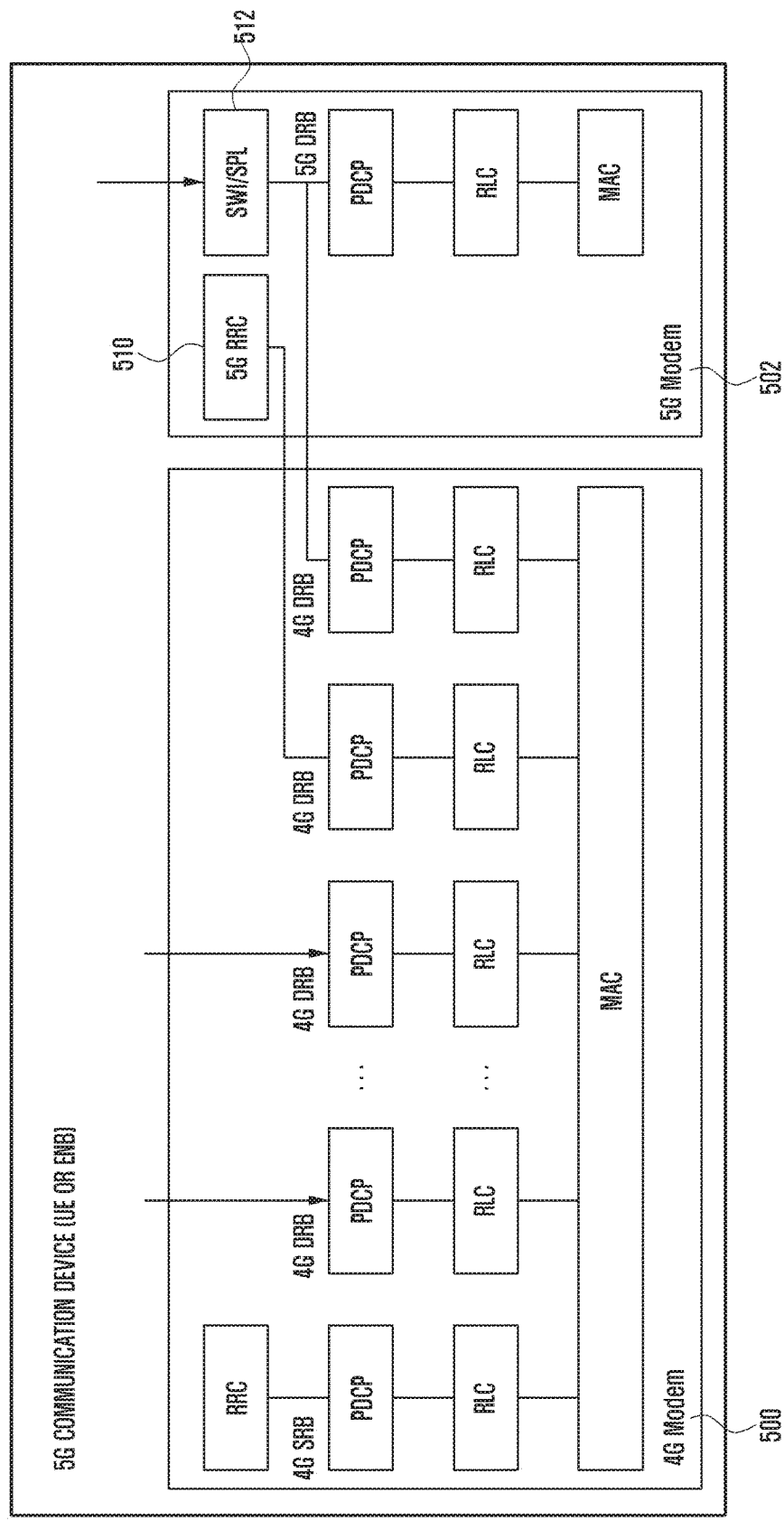
FIG. 5 is a diagram illustrating an example of a detailed device configuration that can carry out according to an embodiment of the present disclosure.

FIG. 5 is a diagram illustrating another example of a detailed device configuration that can carry out according to an embodiment of the present disclosure.

The configuration of FIG. 5 is generally similar to the configuration of FIG. 4, and a 5G RRC 510 and a SWI/SPL 512 are located in a 5G modem 502. In this case, it may be required for the 5G modem 502 controls a 4G modem 500. According to an implementation method, a direct interface may not exist between the 4G modem 500 and the 5G modem 502, and even in this case, the same logical flow is presented, in which a 4G DRB is connected to the 5G RRC 510 or the SWI/SPL 512.

Figure 6:
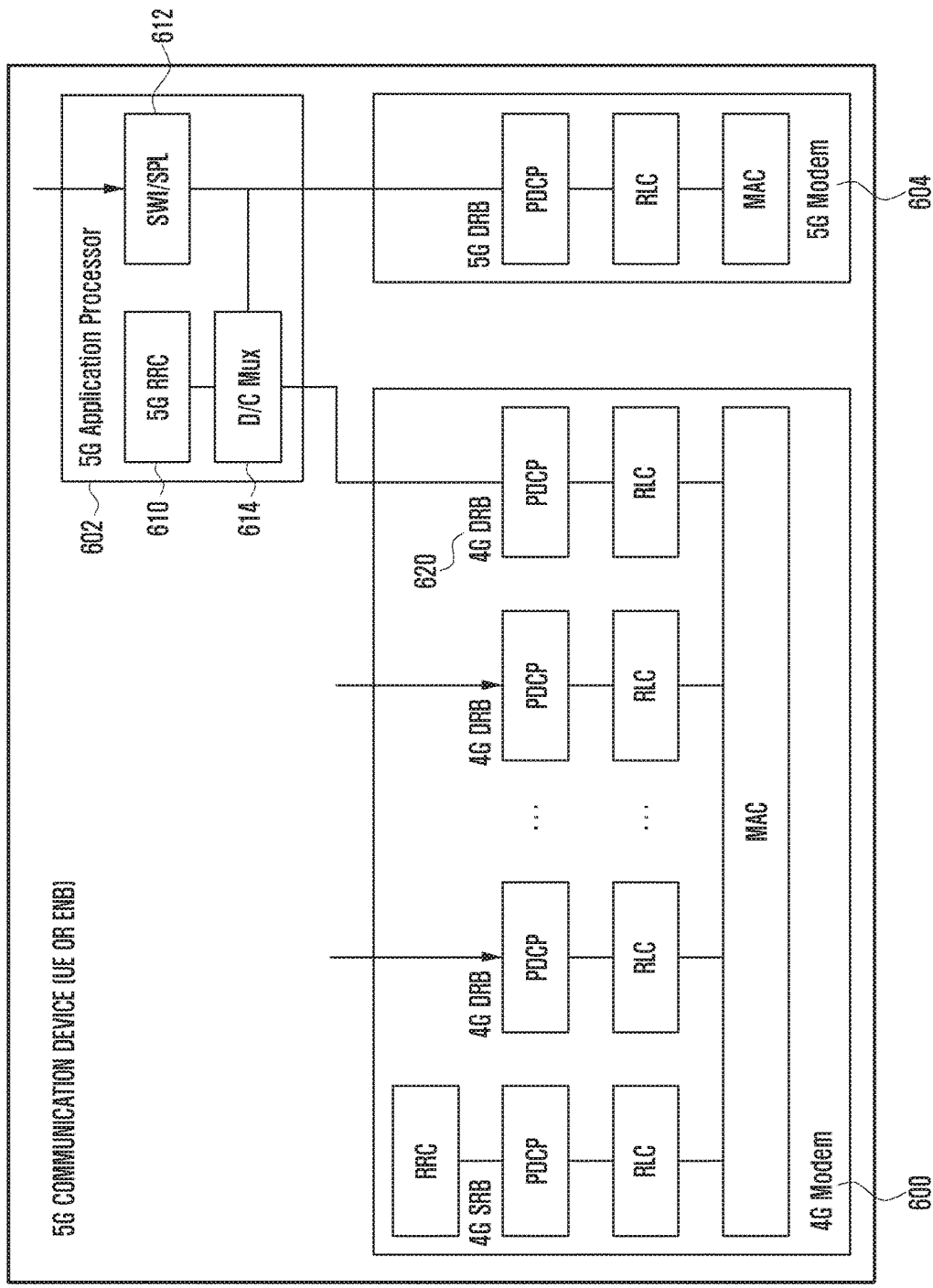
FIG. 6 is a diagram illustrating an example of a detailed device configuration that can carry out according to an embodiment of the present disclosure.

FIG. 6 is a diagram illustrating still another example of a detailed device configuration that can carry out according to an embodiment of the present disclosure.

Referring to FIG. 6, a 5G communication device includes a 4G modem 600, a 5G modem 604, and a 5G AP 602. The configuration of FIG. 6 is generally similar to the configuration of FIG. 4, and a scenario in which 5G data traffic that is connected from a 5G RRC 610 and a SWI/SPL 612 is multiplexed (or muxed) in one 4G DRB 620 is assumed. In this case, a D/C multiplexing (hereinafter referred to as "D/C Mux") function 614 is added, and if necessary, a control message that is transmitted from a 5G RRC 610 and a header type divider that divides data may be added. Such a header may be configured as a SWI/SPL header. In this embodiment, the D/C Mux function may be located in the 5G AP 602.

Figure 7:
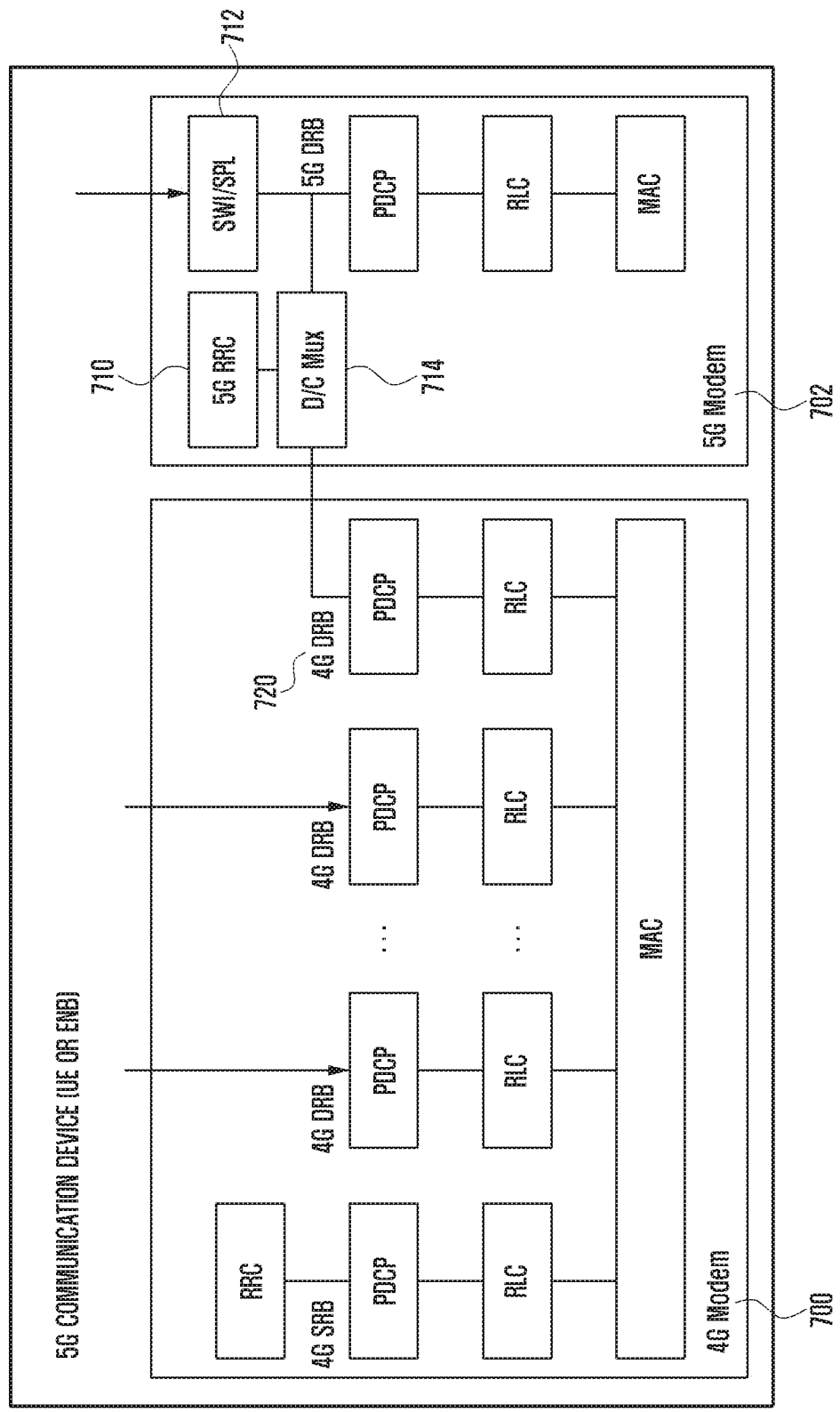
FIG. 7 is a diagram illustrating an example of a detailed device configuration that can carry out according to an embodiment of the present disclosure.

FIG. 7 is a diagram illustrating yet still another example of a detailed device configuration that can carry out according to an embodiment of the present disclosure.

Referring to FIG. 7, a 5G communication device includes a 4G modem 700 and a 5G modem 702. The configuration of FIG. 7 is generally similar to the configuration of FIG. 5, and a scenario in which a control message and 5G data traffic that are connected from a 5G RRC 710 and a SWI/SPL 712 are multiplexed in one 4G DRB 720 is assumed. In this case, a D/C Mux function is added, and if necessary, a control message that is transmitted from a 5G RRC 710 and a header type divider that divides data may be added. Such a header may be configured as a SWI/SPL header. In this embodiment, the D/C Mux function may be located in the 5G modem 702.

Hereinafter, a detailed operation according to the present disclosure will be described.

Figure 8:
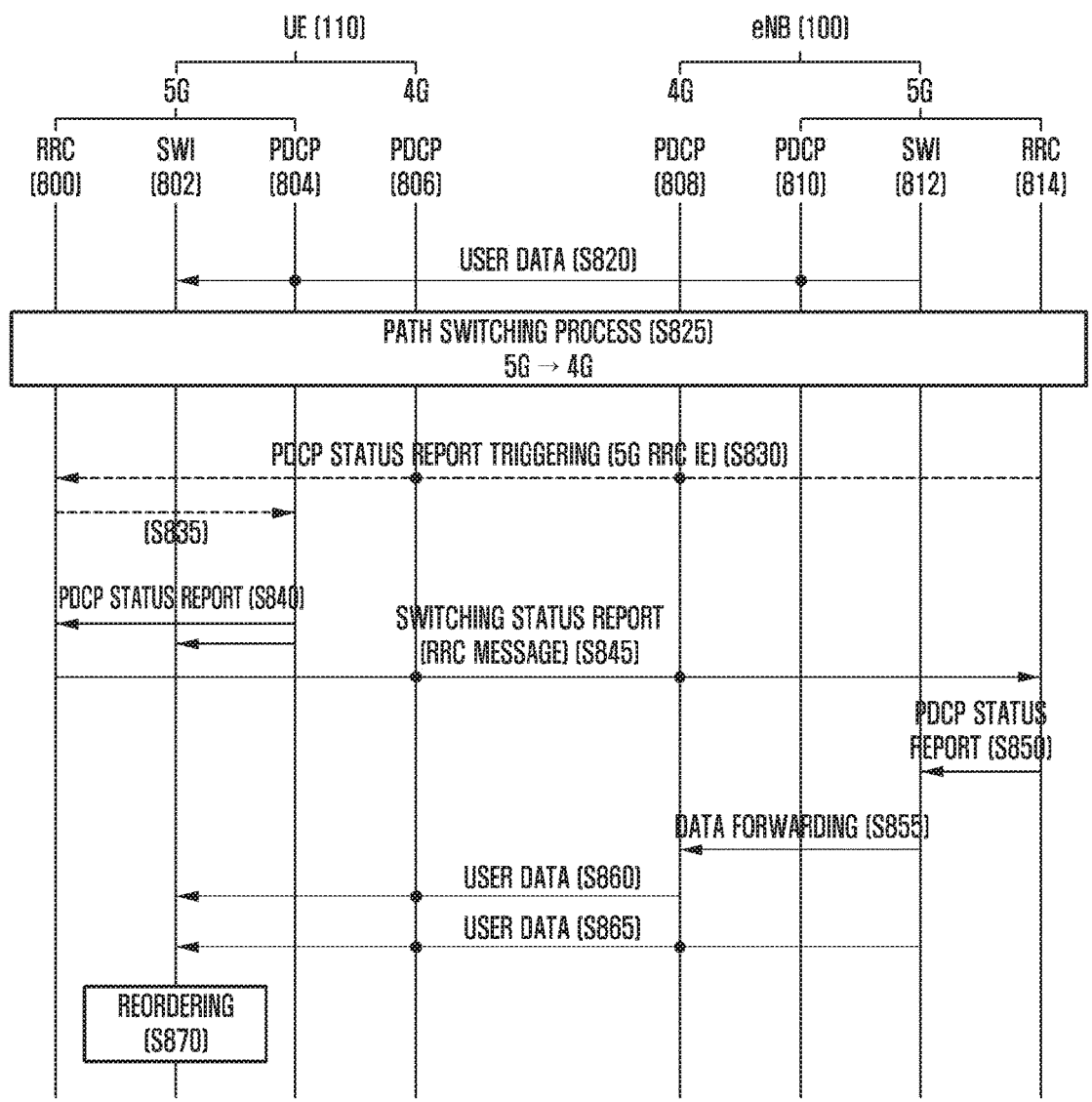
FIG. 8 is a diagram illustrating an example of a method for preventing a loss of downlink data when data path switching is performed from a fifth generation (5G) link to a fourth generation (4G) link according to an embodiment of the present disclosure.

FIG. 8 is a diagram illustrating an example of a method for preventing a loss of downlink data when data path switching is performed from a 5G link to a 4G link according to an embodiment of the present disclosure.

Referring to FIG. 8, a SWI/SPL performs only a switching function, and is hereinafter described as SWI. Further, FIG. 8 illustrates a method for SWIs 802 and 812 to prevent a data loss using PDCP SN information of a 5G communication system and a 4G communication system without any separate header. In FIG. 8 and the subsequent figures, a circular point that is located on an arrow therein means that a message or data is transmitted via a layer having the circular point.

Since a 5G link is first used for data communications, user data, which may be mixedly used with a data packet, a service data unit (SDU), or a packet data unit (PDU), is transmitted to a 5G SWI 802 of a terminal 110 through transmission of the user data from a 5G SWI 812 of a base station 100 to a 5G PDCP 804 of the terminal and a related lower layer through a 5G PDCP sublayer (hereinafter referred to as "PDCP") 810 and a related lower layer (S820). Thereafter, at a specific time, the terminal 110 and the base station 100 perform a switching procedure of a data path from a 5G link to a 4G link (S825). The path switching operation may be defined in several methods, and in the present disclosure, the above-described operation is not limited. In the following operation according to the present disclosure, a message or an information element (IE) in the switching operation may be included in a message in the path switching operation.

After the path switching operation, the base station 100 may request a PDCP status report of the 5G DRB from the terminal 110. In this embodiment, it is assumed that such a report in the form of an IE of the 5G RRC that corresponds to PDCP status report triggering is transmitted from a 5G RRC 814 of the base station to a 5G RRC 800 of the terminal through a 4G PDCP 808 of the base station and a 4G PDCP 806 of the terminal (S830). The PDCP status report triggering IE is transferred from the 5G RRC 800 to the 5G PDCP 806 (S835).

Thereafter, the 5G PDCP 806 prepares a PDCP status report till then, and transmits the prepared PDCP status report to the 5G RRC 800 and an 5G PDCP 804 (S840). The PDCP status report information is generated on the basis of the 5G PDCP SN that is received at the PDCP status report generation time. Thereafter, the terminal 110 transmits a switching status report message to a 5G RRC 814 of the base station 100 through the 5G RRC 800 (S845). In this embodiment, it is assumed that the switching status report is included in an RRC message. In this case, if the 5G PDCP 804 of the terminal 110 transmits information related to the PDCP status report to the 5G RRC 800, the 5G RRC 800 may include the same information in the switching status report to be transmitted. However, such an internal operation of the terminal may differ according to the implementation thereof.

Since the switching status report is included in the 5G RRC message to be transmitted, it is transmitted via the 4G PDCPs 806 and 808 of the terminal and the base station for the stable transmission thereof. However, as described above, since the 4G PDCP transmits the control message that is transmitted from the 5G RRC to the DRB, the contents of the control message cannot be known, and thus are processed as data. Thereafter, the 5G RRC 814 transfers the PDCP status report in the received switching status report to the 5G SWI 812 (S850).

Since the 5G SWI 812 can know the non-received user data through the contents of the 5G PDCP status report that is included in the switching status report, it forwards the data that is not received in the terminal to the sublayer of the 4G PDCP 808 (S855), and then transmits 5G data packets after the path switching operation to the 4G PDCP 808 in order to transmit the 5G data packets to the terminal 110 (S865). The 4G PDCP 808 transmits the data to the 4G PDCP 804 of the terminal 110 through giving of new PDCP SNs (4G PDCP SNs) to the data packets in the reception sequence through the 5G SWI 812 (S860 and S865), and the 4G PDCP 806 of the terminal 110 transfers the data to the 5G SWI 802 that is an upper layer to match the sequence of the 4G PDCP SNs of the data (S860 and S865). In this case, the 5G SWI 802 may order the data sequence through insertion of the PDCP data (which may be mixedly used with the SDU or data packets) that is transferred from the 4G PDCP 806 (S860) in sequence into the non-received user data that is included in the 5G PDCP status report. After restoring all the non-received SDUs that are included in the PDCP status report, the 5G SWI 802 of the terminal 110 may transfer the data upward. This function is called reordering (S870).

In the present disclosure, it is not required that the 5G PDCP SN that was previously given to the data essentially coincides with a 4G PDCP SN that is newly given to the data, but it is important that non-received SDUs that are interpreted on the basis of the 5G PDCP status report using the 5G PDCP SN sequentially correspond to the newly given 4G PDCP SNs. Based on this, the data reordering can be performed in the 5G SWI 802 of the terminal.

As described above, in the whole description of the present disclosure, the 5G SWI is not necessarily required to be located at an upper end of the 5G protocol stack, but may be located on the outside. Actually, as illustrated in FIGS. 4 and 6, the SWI may be located in the 5G AP or in other places.

Figure 9:
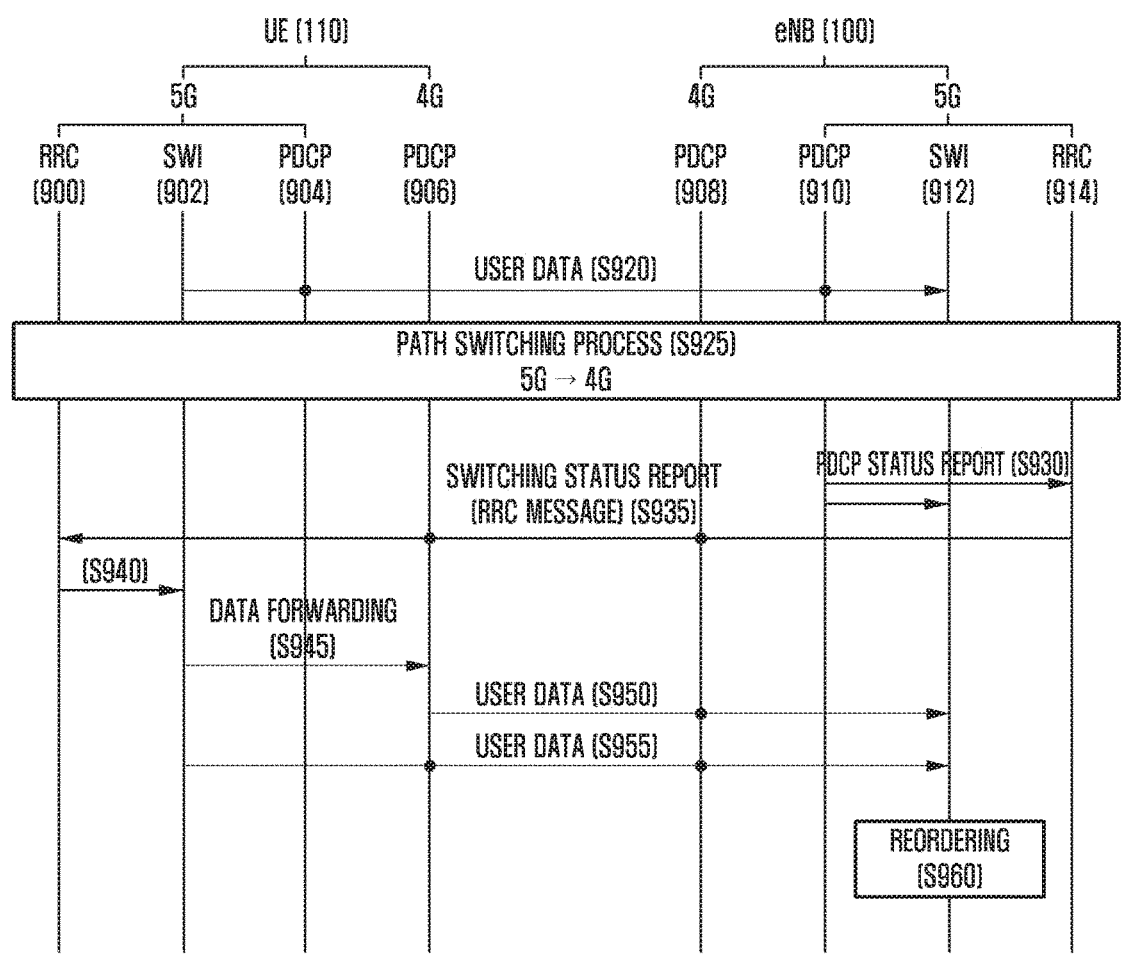
FIG. 9 is a diagram illustrating an example of a method for preventing a loss of uplink data when data path switching is performed from a 5G link to a 4G link according to an embodiment of the present disclosure.

FIG. 9 is a diagram illustrating an example of a method for preventing a loss of uplink data when data path switching is performed from a 5G link to a 4G link according to an embodiment of the present disclosure.

Referring to FIG. 9, a SWI/SPL performs only a switching function, and is hereinafter described as SWI. Further, FIG. 9 illustrates a method for SWIs 902 and 912 to prevent a data loss using PDCP SN information of a 5G communication system and a 4G communication system without any separate header.

Since a 5G link is first used for data communications, user data is transmitted to a 5G SWI 912 of a base station 100 through transmission of the user data from a 5G SWI 902 of a terminal 110 to a 5G PDCP 910 of the base station 100 and a related lower layer through a 5G PDCP 904 and a related lower layer (S920). Thereafter, at a specific time, the terminal 110 and the base station 100 perform a switching operation of a data path from a 5G link to a 4G link (S925).

In this case, a 5G PDCP sublayer 910 of the base station 100 that is a data reception end prepares a PDCP status report and transfers the prepared PDCP status report to the 5G SWI 912 and a 5G RRC 914 (S930). The PDCP status report is in the form of a switching status report of a 5G RRC message, and is transmitted from a 5G RRC 914 of the base station 100 to a 5G RRC 900 of the terminal 100 (S935). In this case, the RRC message information includes the same information as the PDCP status report information. If this message is transferred to a layer of the 5G SWI 902 of the terminal 110 (S940), the 5G SWI 902 forwards non-received SDUs of the PDCP status report to a 4G PDCP 906 of the terminal (S945), and transmits them to the 5G SWI 912 through the 4G PDCP 910 of the base station 100 (S950). Thereafter, the user data is continuously transmitted (S955).

In the same manner as the case of FIG. 8, the terminal sequentially transmits the non-received SDUs that are indicated in the PDCP status report (switching status report) that is prepared using the 5G PDCP SN through the 4G PDCP using the 4G PDCP SN, and the 5G SWI of the base station sequentially puts the PDCP SDUs that are received through the 4G PDCP in the existing SDU places to complete the reordering (S960).

Figure 10:
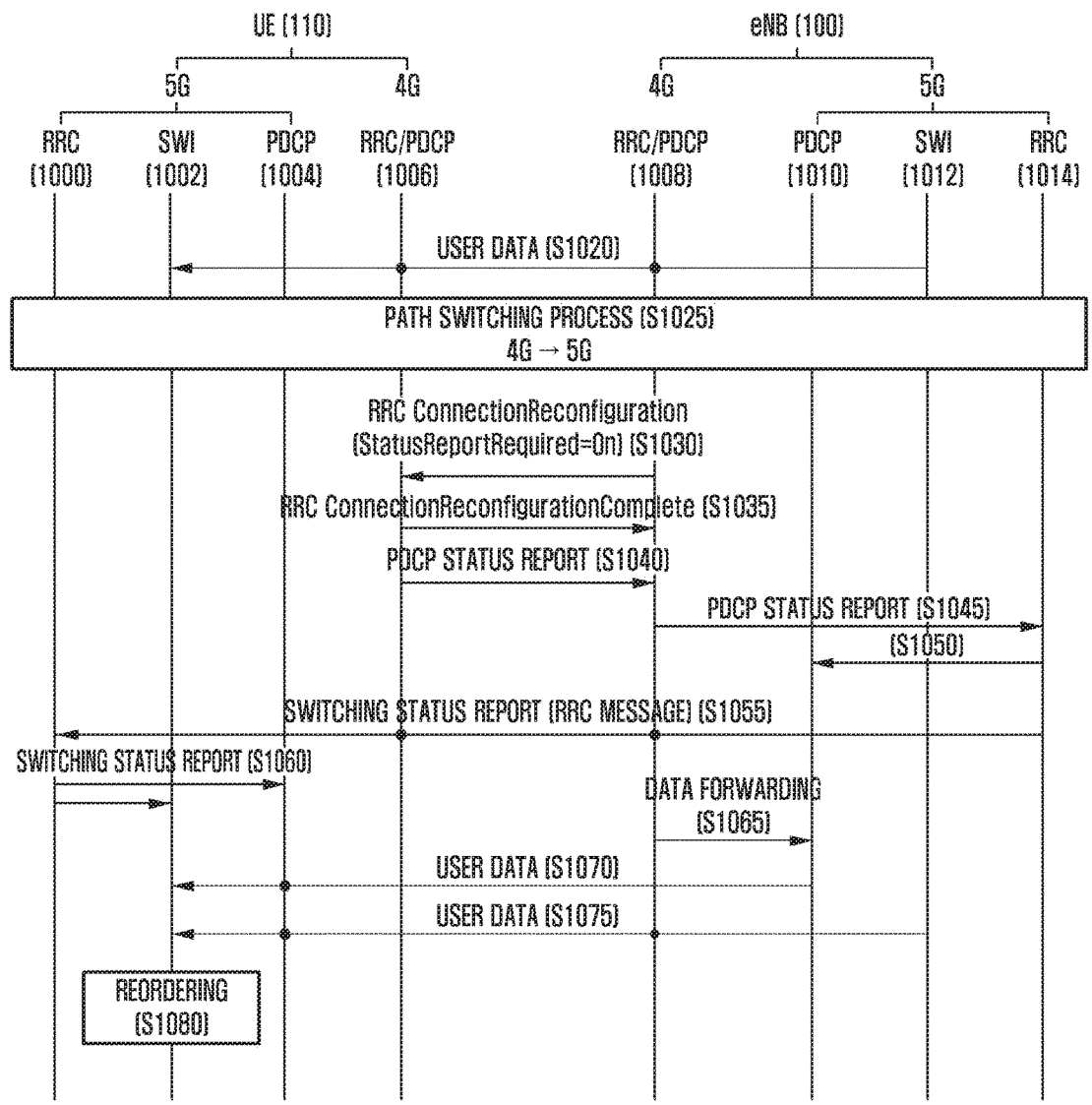
FIG. 10 is a diagram illustrating an example of a method for preventing a loss of downlink data when data path switching is performed from a 4G link to a 5G link according to an embodiment of the present disclosure.

FIG. 10 is a diagram illustrating an example of a method for preventing a loss of downlink data when data path switching is performed from a 4G link to a 5G link according to an embodiment of the present disclosure.

Referring to FIG. 10, a SWI/SPL performs only a switching function, and is hereinafter described as SWI. Further, FIG. 10 illustrates a method for SWIs 1002 and 1012 to prevent a data loss using PDCP SN information of a 5G communication system and a 4G communication system without any separate header.

Since a 4G link is first used for data communications, user data is transmitted to the 5G SWI 1002 of a terminal 110 through transmission of the user data from the 5G SWI 1012 of a base station 100 to a 4G PDCP 1006 of the terminal and a related lower layer through a 4G PDCP 1008 and a related lower layer (S1020). Thereafter, at a specific time, the terminal 110 and the base station 100 perform switching of a data path from a 4G link to a 5G link (S1025). The path switching operation may be defined in several methods, and in the present disclosure, the path switching operation is not limited to the above-described operation. In the following operation according to the present disclosure, a message or an IE in the switching operation may be included.

After the path switching operation, the 4G PDCP 1006 of the terminal 110 cannot directly transmit the status report information to a 5G PDCP 1004, and thus transmits the status report to the base station. For this, the 4G RRC 1008 of the base station 100 transmits an RRCConnectionReconfiguration message that is one of RRC messages to the 4G RRC 1006 through setting of a StatusReportRequired field of the RRCConnectionReconfiguration message to an ON state (S1030), and the 4G RRC 1006 transmits an RRCConnectionReconfigurationComplete message to the 4G RRC 1008 (S1035). Thereafter, the 4G PDCP 1006 transmits the PDCP status report to a 4G PDCP 1010 of the base station (S1040). The 4G PDCP 1010 of the base station transmits this information to a 5G RRC 1014 and the 5G PDCP 1010 (S1045 and S1050), and the 5G RRC 1014 that has received the PDCP status report transmits a switching status report message to the 5G RRC 1000 of the terminal 110 (S1055). Thereafter, the 5G RRC 1000 transfers the switching status report or a PDCP status report provided therein to the 5G PDCP 1004 and the 5G SWI 1002 (S1060).

Then, the 4G PDCP 1008 of the base station 100 forwards non-received PDCP SDUs (or PDCP protocol data units (PDUs)) based on the status report to the 5G PDCP 1010 (or 5G SWI 1012) (in FIG. 10, it is indicated as the 5G PDCP) (S1065), and first transmits the forwarded data to the terminal 110 through the 5G PDCP 1010 (S1070). Thereafter, the data is sequentially transmitted to the terminal (S1075). In this case, the data is transmitted from the 5G PDCP 1010 of the base station 100 to the 5G PDCP 1004 of the terminal 110, and the data that is transmitted to the terminal is transferred to the 5G SWI 1002 to perform the reordering on the basis of the status report information (S1080).

Figure 11:
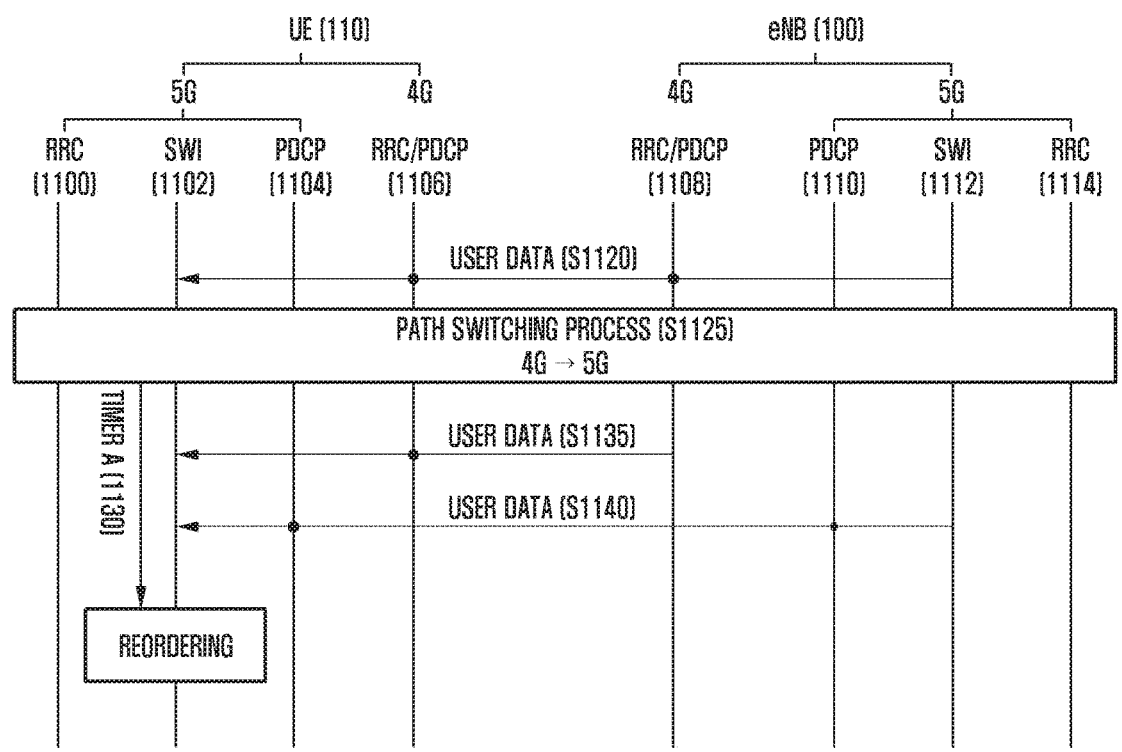
FIG. 11 is a diagram illustrating another example of a method for preventing a loss of downlink data when data path switching is performed from a 4G link to a 5G link according to an embodiment of the present disclosure.

FIG. 11 is a diagram illustrating another example of a method for preventing a loss of downlink data when data path switching is performed from a 4G link to a 5G link according to an embodiment of the present disclosure.

Referring to FIG. 11, a SWI/SPL performs only a switching function, and is hereinafter described as SWI. Further, FIG. 11 illustrates a method for SWIs 1102 and 1112 to prevent a data loss without any separate header.

Since a 4G link is first used for data communications, user data is transmitted to the 5G SWI 1102 of a terminal 110 through transmission of the user data from the 5G SWI 1112 of a base station 100 to a 4G PDCP 1106 of the terminal 110 and a related lower layer through a 4G PDCP 1108 and a related lower layer (S1120). Thereafter, at a specific time, the terminal 110 and the base station 100 perform switching of a data path from a 4G link to a 5G link (S1125). The path switching operation may be defined in several methods, and in the present disclosure, the path switching operation is not limited to the above-described operation.

In FIG. 11, after the path switching operation is completed, a timer A 1130 operates. The length of the timer A may be predetermined or may be settable. Until the timer A expires, the terminal 110 receives only data that is transferred to the 5G SWI 1102 of the terminal 110 through 4G PDCPs 1106 and 1108 of the base station and the terminal (S1135), and sequentially transmits the received data upward. After the timer A expires, the terminal 110 may sequentially transmit the data that is transmitted to the 5G SWI 1102 through the 5G PDCPs 1104 and 1110 of the base station and the terminal upward (S1140).

This is because, since the data before the path switching operation has been transmitted using the 4G link, it is expected that the data that is transmitted through the 4G PDCPs 1106 and 1108 of the base station and the terminal precedes the data that is transmitted through the 5G PDCPs 1104 and 1110 of the base station and the terminal. For the above-described operation, the length of the timer A may be properly set.

Figure 12:
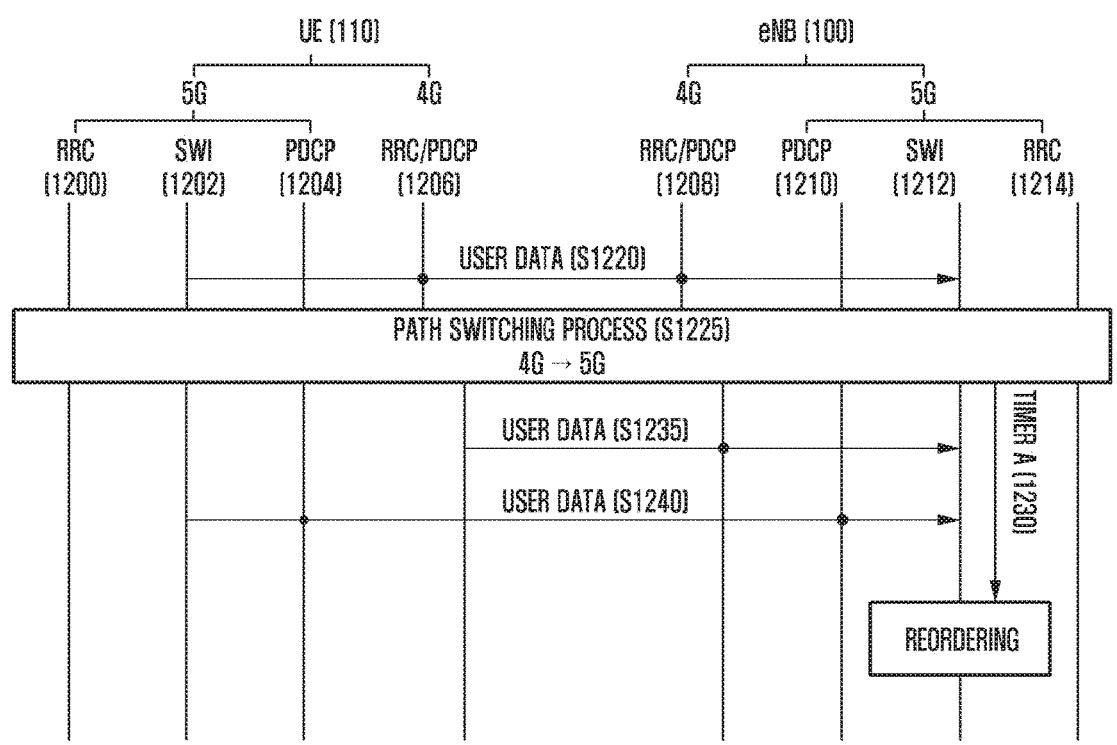
FIG. 12 is a diagram illustrating an example of a method for preventing a loss of uplink data when data path switching is performed from a 4G link to a 5G link according to an embodiment of the present disclosure.

FIG. 12 is a diagram illustrating another example of a method for preventing a loss of uplink data when data path switching is performed from a 4G link to a 5G link according to an embodiment of the present disclosure.

Referring to FIG. 12, a SWI/SPL performs only a switching function, and is hereinafter described as SWI. Further, FIG. 12 illustrates a method for a SWI to prevent a data loss without any separate header.

Since a 4G link is first used for data communications, user data is transmitted to a 5G SWI 1212 of a base station 100 through transmission of the user data from a 5G SWI 1202 of a terminal 110 to a 4G PDCP 1208 of the base station 100 and a related lower layer through a 4G PDCP 1206 and a related lower layer (S1220). Thereafter, at a specific time, the terminal 110 and the base station 100 perform switching of a data path from a 4G link to a 5G link (S1225). The path switching operation may be defined in several methods, and in the present disclosure, the path switching operation is not limited to the above-described operation.

In FIG. 12, after the path switching operation is completed, a timer A 1230 operates. The length of the timer A may be predetermined or may be settable. Until the timer A expires, the base station 100 receives only data that is transmitted to the 5G SWI 1212 of the base station 100 through the 4G PDCPs 1206 and 1208 of the base station and the terminal (S1235), and sequentially transmits the received data upward. After the timer A expires, the terminal 110 may sequentially transmit the data that is transmitted to the 5G SWI 1212 through the 5G PDCPs 1204 and 1210 of the base station and the terminal upward (S1240).

Figure 13:
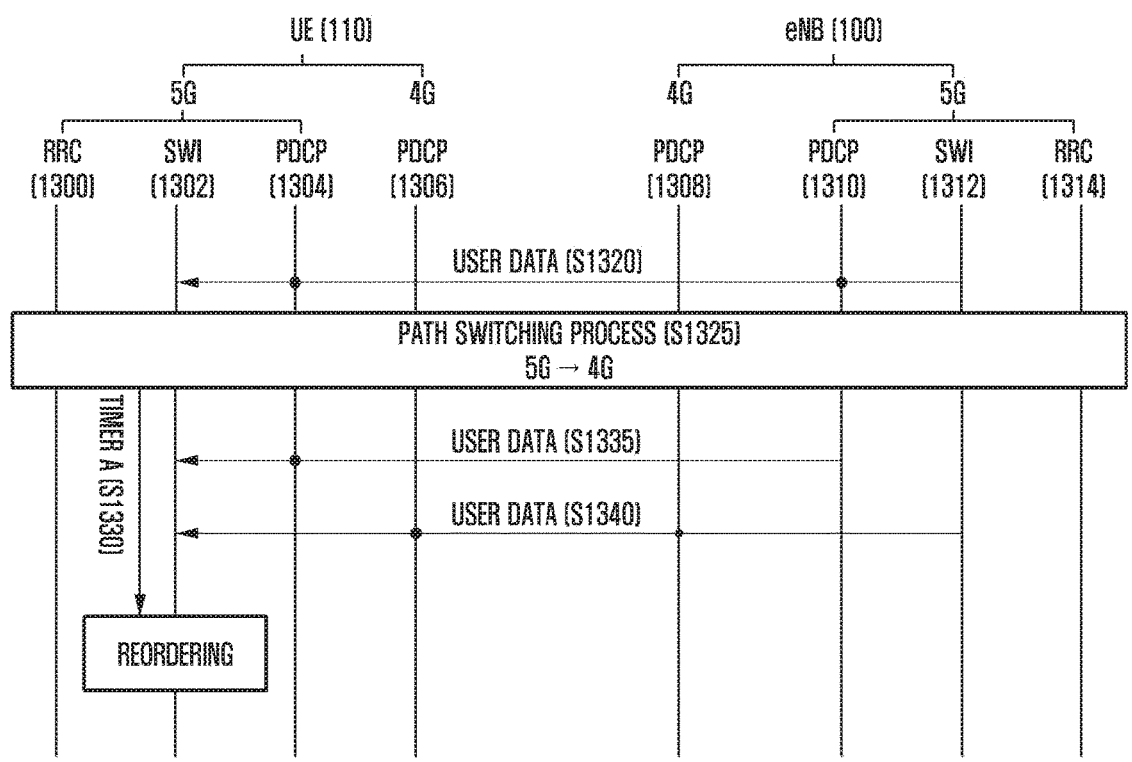
FIG. 13 is a diagram illustrating another example of a method for preventing a loss of downlink data when data path switching is performed from a 5G link to a 4G link according to an embodiment of the present disclosure.

FIG. 13 is a diagram illustrating another example of a method for preventing a loss of downlink data when data path switching is performed from a 5G link to a 4G link according to an embodiment of the present disclosure.

Referring to FIG. 13, a SWI/SPL performs only a switching function, and is hereinafter described as SWI. Further, FIG. 13 illustrates a method for a SWI to prevent a data loss without any separate header.

Since a 5G link is first used for data communications, user data is transmitted to a 5G SWI 1302 of a terminal 110 through transmission of the user data from a 5G SWI 1312 of a base station 100 to a 5G PDCP 1304 of the terminal 110 and a related lower layer through a 5G PDCP 1310 and a related lower layer (S1320). Thereafter, at a specific time, the terminal 110 and the base station 100 perform switching of a data path from a 5G link to a 4G link (S1325). The path switching operation may be defined in several methods, and in the present disclosure, the path switching operation is not limited to the above-described operation.

In an embodiment of FIG. 13, it is assumed that even at a time when the path switching operation is completed, data that is in a 5G PDCP buffer of the base station can be transmitted to the 5G PDCP 1304 of the terminal in all. After transmitting all the data stored in the 5G PDCP buffer thereof, the base station transfers the data to the terminal through 4G PDCPs 1306 and 1308 of the base station and the terminal, which are the switched paths.

In an embodiment of FIG. 13, after the path switching operation is completed, a timer A operates. The length of the timer A may be predetermined or may be settable. Until the timer A expires, the terminal 110 receives only data that is transmitted to the 5G SWI 1312 of the base station 100 through the 5G SWI 1302 through the 5G PDCPs 1304 and 1310 of the base station and the terminal (S1335), and sequentially transmits the received data upward. After the timer A expires, the 5G SWI 1302 of the terminal may sequentially transmit the data that is transmitted through the 4G PDCPs 1306 and 1308 of the base station and the terminal upward (S1325).

Figure 14:
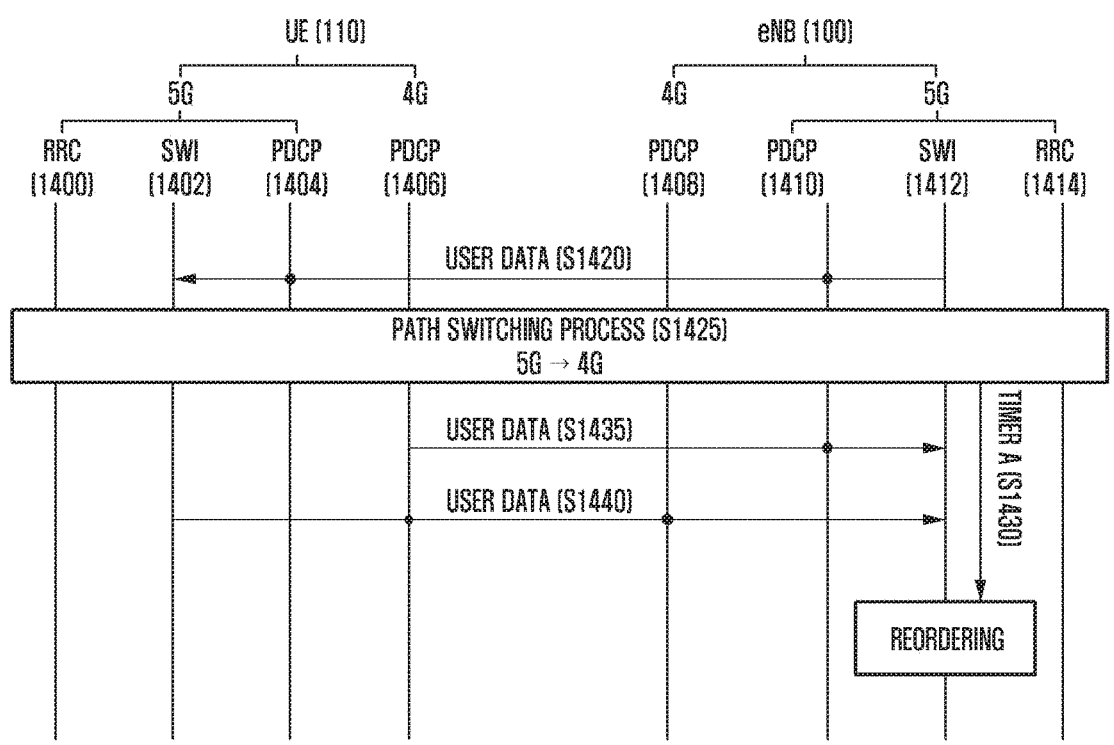
FIG. 14 is a diagram illustrating another example of a method for preventing a loss of uplink data when data path switching is performed from a 5G link to a 4G link according to an embodiment of the present disclosure.

FIG. 14 is a diagram illustrating another example of a method for preventing a loss of uplink data when data path switching is performed from a 5G link to a 4G link according to an embodiment of the present disclosure.

Referring to FIG. 14, a SWI/SPL performs only a switching function, and is hereinafter described as SWI. Further, FIG. 14 illustrates a method for a SWI to prevent a data loss without any separate header.

Since a 5G link is first used for data communications, user data is transmitted to a 5G SWI 1412 of a base station 100 through transmission of the user data from a 5G SWI 1402 of a terminal 110 to a 5G PDCP 1410 of the base station 100 and a related lower layer through a 5G PDCP 1404 and a related lower layer (S1420). Thereafter, at a specific time, the terminal 110 and the base station 100 perform switching of a data path from a 5G link to a 4G link (S1425). The path switching operation may be defined in several methods, and in the present disclosure, the path switching operation is not limited to the above-described operation.

In FIG. 14, it is assumed that even at a time when the path switching operation is completed, data that is in a 5G PDCP buffer of the terminal 110 can be transmitted to the 5G PDCP 1410 of the base station 100 in all. After transmitting all the data stored in the 5G PDCP buffer thereof, the terminal transfers the data to the base station through 4G PDCPs 1406 and 1408 of the base station and the terminal, which are the switched paths.

In an embodiment of FIG. 14, after the path switching operation is completed, a timer A operates (S1430). The length of the timer A may be predetermined or may be settable. Until the timer A expires, the base station 100 receives only data that is transmitted to the 5G SWI 1412 through the 5G PDCPs 1404 and 1410 of the base station and the terminal (S1435), and sequentially transmits the received data upward. After the timer A expires, the 5G SWI 1412 of the base station may sequentially transmit the data that is transmitted through the 4G PDCPs 1406 and 1408 of the base station and the terminal upward (S1440).

Figure 15:
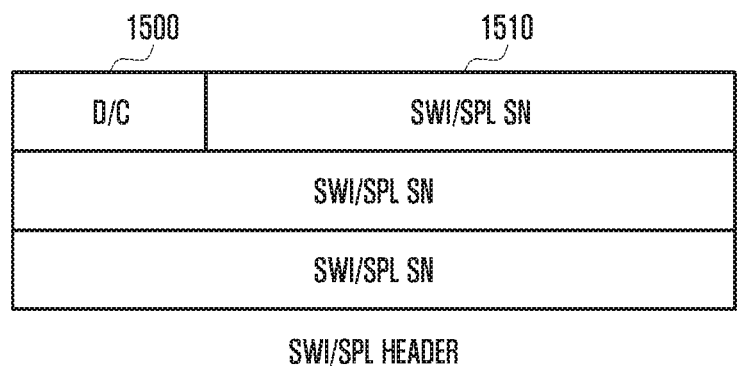
FIG. 15 is a diagram illustrating an example of a switching (SWI)/splitting (SPL) header structure in the case where SWI/SPL has a sequence number (SN) according to an embodiment of the present disclosure.

FIG. 15 is a diagram illustrating an example of a SWI/SPL header structure in the case where SWI/SPL has a SN according to an embodiment of the present disclosure.

Referring to FIG. 15, a SWI/SPL SN 1510 has a length of 23 bits, and a D/C field 1500 is arranged with a length of one bit to cope with a case where the D/C Mux function as illustrated in FIGS. 6 and 7 is added. However, the length of the SN or the existence/nonexistence of the D/C field may differ depending on the detailed operation according to the present disclosure.

Figure 16:
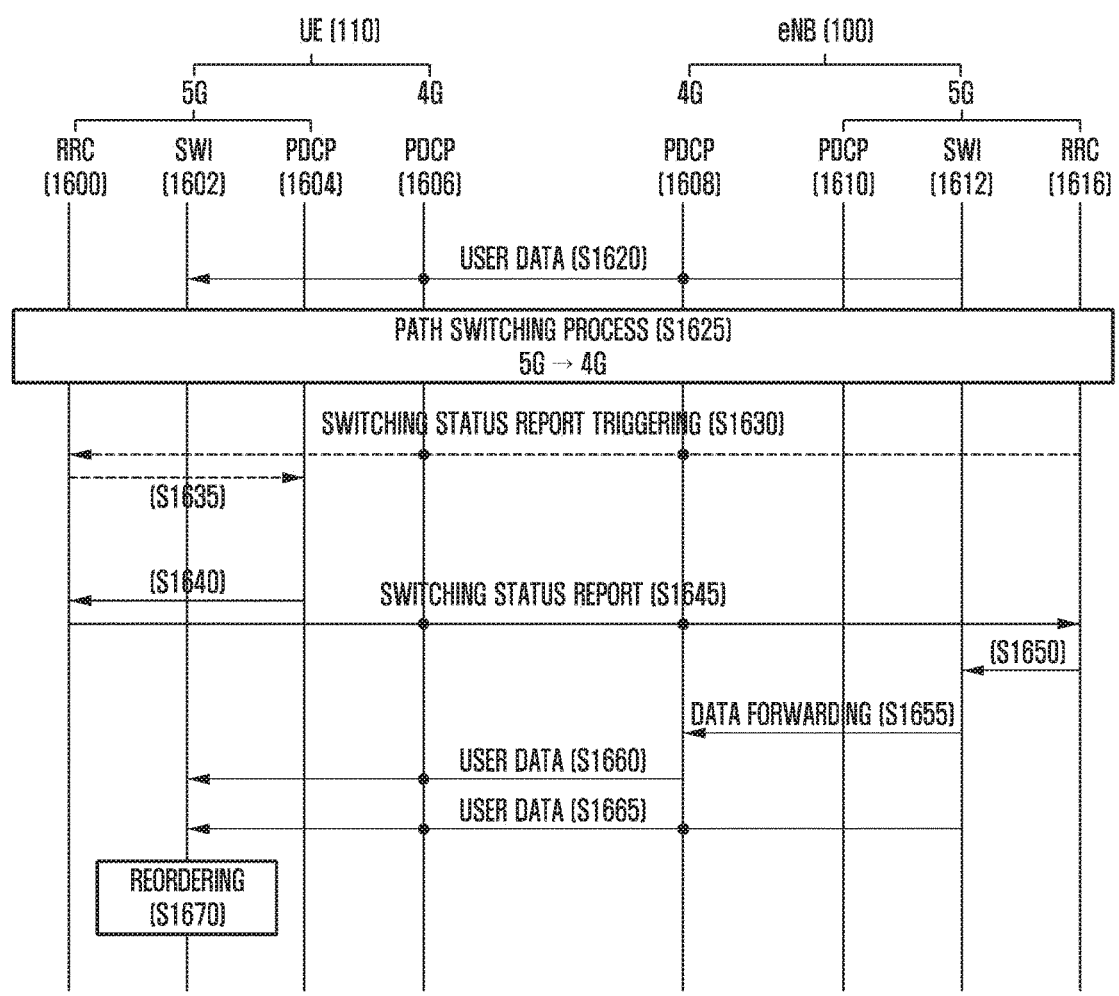
FIG. 16 is a diagram illustrating an example of a method for preventing a loss of downlink data when data path switching is performed from a 5G link to a 4G link according to an embodiment of the present disclosure.

FIG. 16 is a diagram illustrating still another example of a method for preventing a loss of downlink data when data path switching is performed from a 5G link to a 4G link according to an embodiment of the present disclosure.

Referring to FIG. 16, a SWI/SPL performs only a switching function, and is hereinafter described as SWI. Further, FIG. 16 illustrates a method for preventing a data loss using SN information of a header that includes the SN of the function as described above with reference to FIG. 15.

Since a 5G link is first used for data communications, user data is transmitted to a 5G SWI 1602 of a terminal 110 through transmission of the user data from a 5G SWI 1612 of a base station 100 to a 5G PDCP 1604 of the terminal 110 and a related lower layer through a 5G PDCP 1608 and a related lower layer (S1620). In this case, the 5G SWI 1612 of the base station 100 transmits the data through addition of an SWI header thereto, and the 5G SWI 1602 of the terminal 110 transmits SDUs upward after removal of the SWI header. Thereafter, at a specific time, the terminal 110 and the base station 100 perform switching of a data path from a 5G link to a 4G link (S1625).

In this case, a 5G RRC 1614 of the base station may generate switching status report triggering. The switching status report triggering is encapsulated into a 5G RRC message to be transmitted from the base station 100 to the terminal 110 via 4G PDCPs 1608 and 1606 of the base station and the terminal (S1630). A switching status report triggering message is transferred from a 5G RRC 1600 of the terminal 110 to the 5G SWI 1602 (S1635). Such a switching status report triggering procedure may be included in the path switching operation (S1625) or may be omitted.

The terminal 110 transmits a switching status report to the base station 100 after the path switching process or the switching status report triggering. In this case, the 5G SWI 1602 of the terminal transmits information related to non-received SDUs to the 5G RRC 1600 of the terminal (S1640), the 5G RRC 1600 of the terminal transmits a switching status report to the 5G RRC 1614 of the base station (S1645), and the 5G RRC 1614 of the base station transmits the switching status report or information related to the non-received SDUs that is included in the switching status report to the 5G SWI 1612 (S1650). The type of the switching status report may be the type that is similar to the type of the PDCP status report or may be the type of the RRC message. In FIG. 16, the switching status report is described as a message that is encapsulated into the 5G RRC message. Further, such switching status report information may be based on the SWI SN.

The 5G SWI 1612 of the base station that has received the switching status report information that is transferred thereto transmits the non-received data (SDUs) to the 4G PDCP 1608 of the base station on the basis of this information (S1655). The 4G PDCP 1608 transmits the data that is received from the 5G SWI 1612 to the 5G SWI 1602 through the 4G PDCP 1606 of the terminal (S1660), and the 5G SWI 1602 may perform a reordering procedure on the basis of the SN that is included in the SWI header (S1670).

Figure 17:
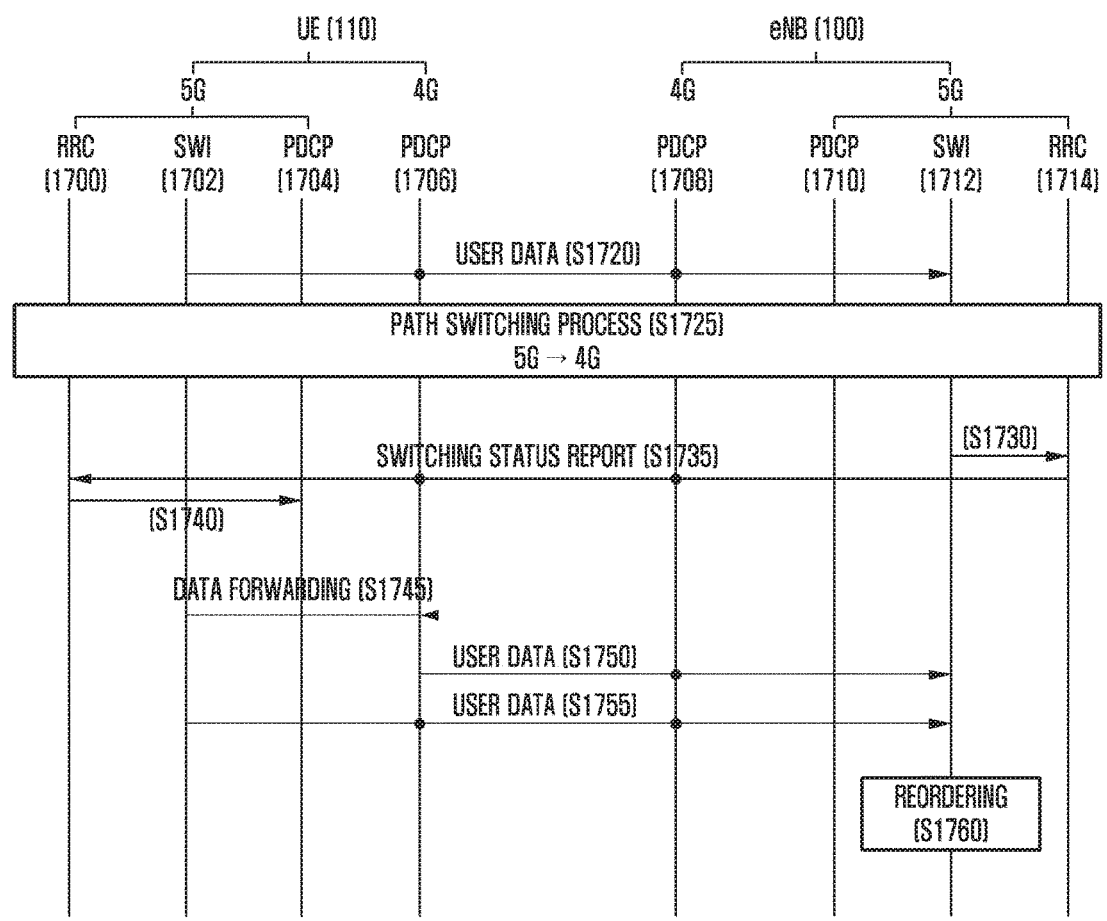
FIG. 17 is a diagram illustrating an example of a method for preventing a loss of uplink data when data path switching is performed from a 5G link to a 4G link according to an embodiment of the present disclosure.

FIG. 17 is a diagram illustrating still another example of a method for preventing a loss of uplink data when data path switching is performed from a 5G link to a 4G link according to an embodiment of the present disclosure.

Referring to FIG. 17, a SWI/SPL performs only a switching function, and is hereinafter described as SWI. Further, FIG. 17 illustrates a method for preventing a data loss using SN information of a header that includes the SN of the function as described above with reference to FIG. 15.

Since a 5G link is first used for data communications, user data is transmitted to a 5G SWI 1712 of a base station 100 through transmission of the user data from a 5G SWI 1702 of a terminal 110 to a 5G PDCP 1710 of the base station 100 and a related lower layer through a 5G PDCP 1704 and a related lower layer (S1720). In this case, the 5G SWI 1702 of the terminal 110 transmits the data through addition of an SWI header thereto, and the 5G SWI 1712 of the base station 100 sends SDUs upward after removal of the SWI header. Thereafter, at a specific time, the terminal 110 and the base station 100 perform switching of a data path from a 5G link to a 4G link (S1725).

The base station 100 transmits a switching status report to the terminal 110 after the path switching operation. Specifically, the 5G SWI 1712 of the base station transmits information related to non-received SDUs to the 5G RRC 1714 (S1730), the 5G RRC 1714 of the base station transmits a switching status report to the 5G RRC 1700 of the terminal (S1735), and the 5G RRC 1700 of the terminal transmits the switching status report or information related to the non-received SDUs that is included in the switching status report to the 5G SWI 1702 (S1740). The type of the switching status report may be the type that is similar to the type of the PDCP status report or may be the type of the RRC message. In FIG. 17, the switching status report is described as a message that is encapsulated into the 5G RRC message. Further, such switching status report information may be based on the SWI SN.

The 5G SWI 1702 of the terminal that has received the switching status report information that is transferred thereto forwards the non-received SDUs to the 4G PDCP 1706 on the basis of this information (S1745). The 4G PDCP 1706 transmits the data that is transferred from the 5G SWI 1702 to the 5G SWI 1712 through the 4G PDCP 1708 of the base station (S1750), and the 5G SWI 1712 may perform a reordering procedure on the basis of the SWI SN (S1760).

Figure 18:
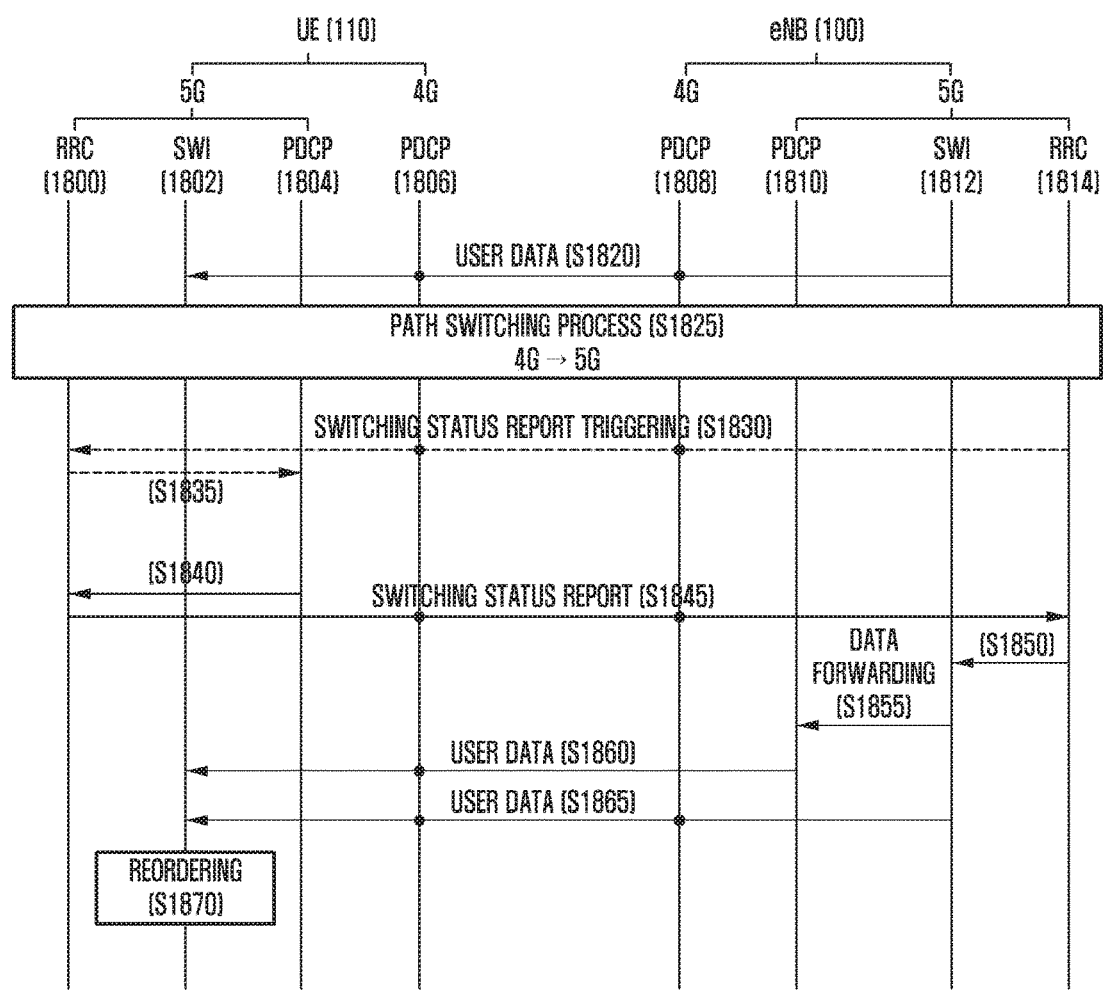
FIG. 18 is a diagram illustrating an example of a method for preventing a loss of downlink data when data path switching is performed from a 4G link to a 5G link according to an embodiment of the present disclosure.

FIG. 18 is a diagram illustrating still another example of a method for preventing a loss of downlink data when data path switching is performed from a 4G link to a 5G link according to an embodiment of the present disclosure.

Referring to FIG. 18, a SWI/SPL performs only a switching function, and is hereinafter described as SWI. Further, FIG. 18 illustrates a method for preventing a data loss using SN information of a header that includes the SN of the function as described above with reference to FIG. 15.

Since a 4G link is first used for data communications, user data is transmitted to a 5G SWI 1802 of a terminal 110 through transmission of the user data from a 5G SWI 1812 of a base station 100 to a 4G PDCP 1806 of the terminal 110 and a related lower layer through a 4G PDCP 1808 and a related lower layer (S1820). In this case, the 5G SWI 1812 of the base station 100 transmits the data through addition of an SWI header thereto, and the 5G SWI 1802 of the terminal 110 sends SDUs upward after removal of the SWI header. Thereafter, at a specific time, the terminal 110 and the base station 100 perform switching of a data path from a 4G link to a 5G link (S1825).

In this case, a 5G RRC 1814 of the base station may generate switching status report triggering. The switching status report triggering is encapsulated into a 5G RRC message to be transmitted from the base station 100 to the terminal 110 via 4G PDCPs 1806 and 1808 of the base station and the terminal (S1830). A switching status report triggering message is transferred from a 5G RRC 1800 of the terminal 110 to the 5G SWI 1802 (S1835). Such a switching status report triggering procedure may be included in the path switching operation (S1825) or may be omitted.

The terminal 110 transmits a switching status report to the base station 100 after the path switching process or the switching status report triggering. In this case, the 5G SWI 1802 of the terminal transmits information related to non-received SDUs to the 5G RRC 1800 of the terminal (S1840), the 5G RRC 1800 of the terminal transmits a switching status report to the 5G RRC 1814 of the base station (S1845), and the 5G RRC 1814 of the base station transmits the switching status report or information related to the non-received SDUs that is included in the switching status report to the 5G SWI 1812 (S1850). The type of the switching status report may be the type that is similar to the type of the PDCP status report or may be the type of the RRC message. In FIG. 18, the switching status report is described as a message that is encapsulated into the 5G RRC message. Further, such switching status report information may be based on the SWI SN.

The 5G SWI 1812 of the base station that has received the switching status report information that is transferred thereto transmits the non-received data (SDUs) to the 5G PDCP 1810 of the base station on the basis of this information (S1855). The 5G PDCP 1810 of the base station transmits the data that is transmitted from the 5G SWI 1812 of the base station to the 5G SWI 1802 of the terminal through the 5G PDCP 1804 of the terminal (S1860). Thereafter, the 5G SWI 1802 of the terminal may perform a reordering procedure on the basis of the SWI SN (S1870).

Figure 19:
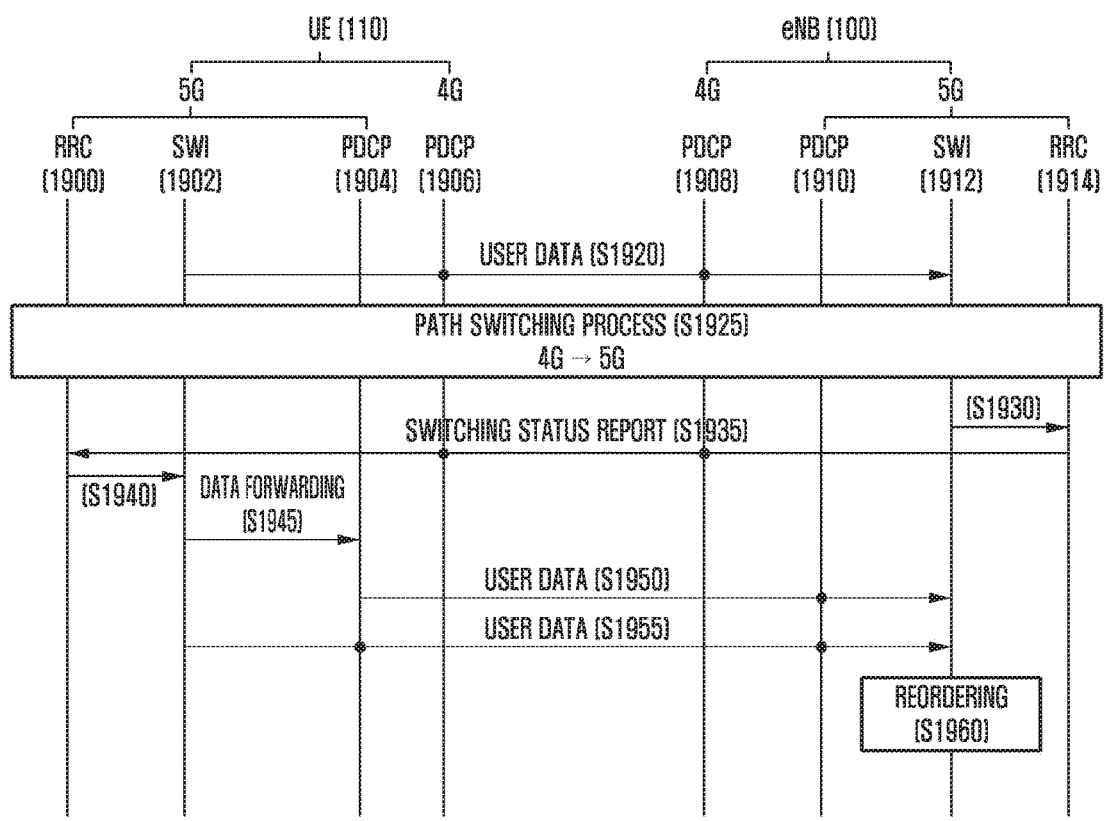
FIG. 19 is a diagram illustrating an example of a method for preventing a loss of uplink data when data path switching is performed from a 4G link to a 5G link according to an embodiment of the present disclosure.

FIG. 19 is a diagram illustrating still another example of a method for preventing a loss of uplink data when data path switching is performed from a 4G link to a 5G link according to an embodiment of the present disclosure.

Referring to FIG. 19, a SWI/SPL performs only a switching function, and is hereinafter described as SWI. Further, FIG. 19 illustrates a method for preventing a data loss using SN information of a header that includes the SN of the function as described above with reference to FIG. 15.

Since a 4G link is first used for data communications, user data is transmitted to a 5G SWI 1912 of a base station 100 through transmission of the user data from a 5G SWI 1902 of a terminal 110 to a 4G PDCP 1908 of the base station 100 and a related lower layer through a 4G PDCP 1906 and a related lower layer (S1920). In this case, the 5G SWI 1902 of the terminal 110 transmits the data (SDUs) through addition of an SWI header thereto, and the 5G SWI 1912 of the base station 100 sends SDUs upward after removal of the SWI header. Thereafter, at a specific time, the terminal 110 and the base station 100 perform switching of a data path from a 4G link to a 5G link (S1925).

The base station 100 transmits a switching status report to the terminal 110 after the path switching operation. Specifically, the 5G SWI 1912 of the base station transmits information related to non-received SDUs to the 5G RRC 1914 (S1930), the 5G RRC 1914 of the base station transmits a switching status report to the 5G RRC 1900 of the terminal (S1935), and the 5G RRC 1900 of the terminal transmits the switching status report or information related to the non-received SDUs that is included in the switching status report to the 5G SWI 1902 (S1940). The type of the switching status report may be the type that is similar to the type of the PDCP status report or may be the type of the RRC message. In FIG. 19, the switching status report is described as a message that is encapsulated into the 5G RRC message. Further, such switching status report information may be based on the SWI SN.

The 5G SWI 1902 of the terminal that has received the switching status report information that is transferred thereto forwards the non-received SDUs to the 5G PDCP 1910 on the basis of this information (S1945). The 5G PDCP 1904 transmits the data that is transferred from the 5G SWI 1902 to the 5G SWI 1912 through the 5G PDCP 1910 of the base station (S1950), and the 5G SWI may perform a reordering procedure on the basis of the SWI SN (S1960).

Figure 20:
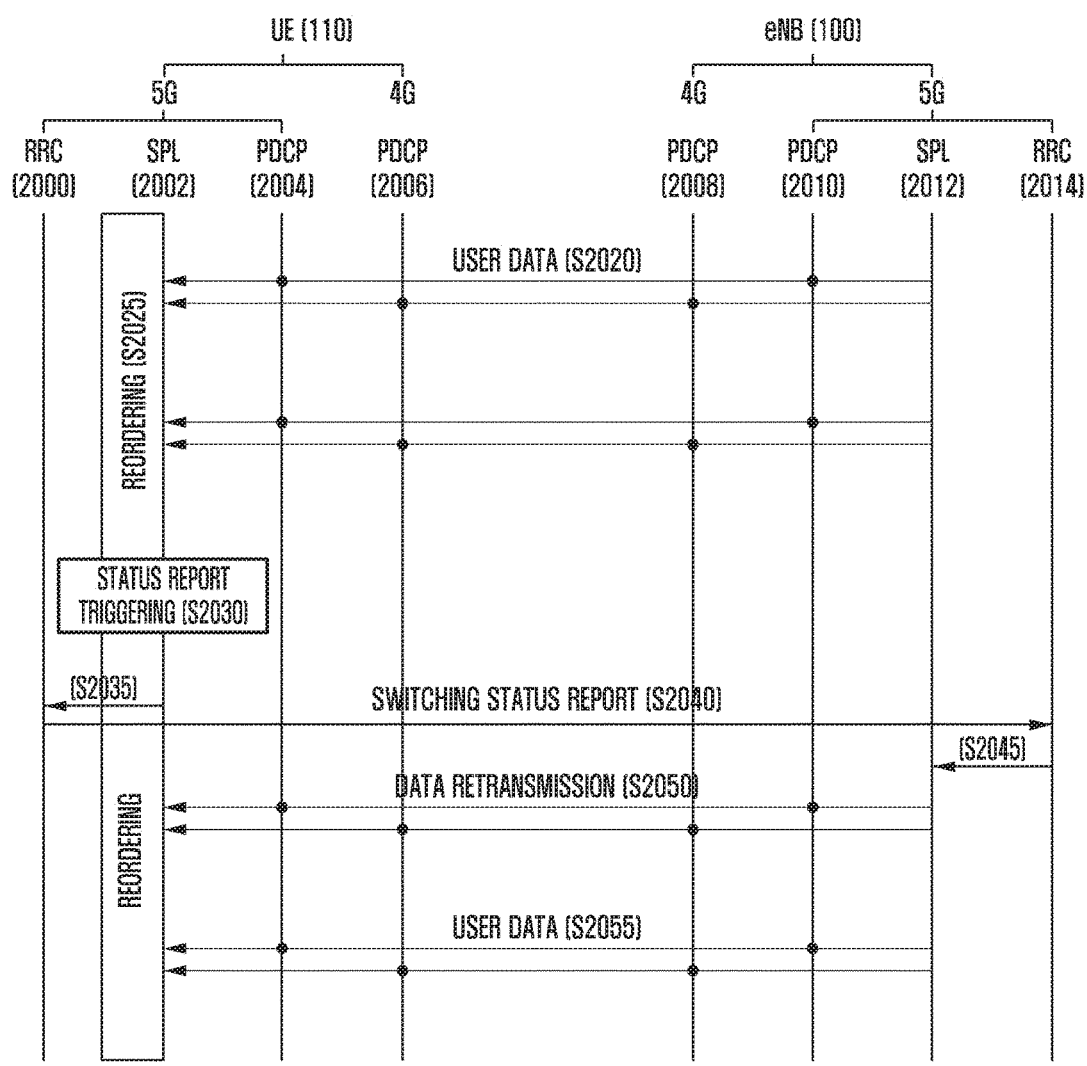
FIG. 20 is a diagram illustrating an example of a method for preventing a loss of downlink data when data path splitting, through which data is transmitted to both a 5G link and a 4G link, is performed according to an embodiment of the present disclosure.

FIG. 20 is a diagram illustrating an example of a method for preventing a loss of downlink data when data path splitting, through which data is transmitted to both a 5G link and a 4G link, is performed according to an embodiment of the present disclosure.

Referring to FIG. 20, a SWI/SPL performs only a splitting function, and is hereinafter described as SPL. If at least one link of a path that is split and transmitted is not valid anymore according to circumstances, a terminal (UE) 110 and a base station (eNB) 100 may operate to perform path switching like the above-described various embodiments. FIG. 20 illustrates a method for preventing a data loss using SN information of a header that includes the SN of the function as described above with reference to FIG. 15.

In FIG. 20, a path for transmitting user data from a 5G SPL 2012 of the base station 100 to a 5G SPL 2002 of the terminal 110 through a 5G PDCP 2010 of the base station and a 5G PDCP 2004 of the terminal and a path for transmitting user data from a 5G SPL 2010 of the base station to the 5G SPL 2002 of the terminal through a 4G PDCP 2008 of the base station and a 4G PDCP 2006 of the terminal coexist (S2020). In this case, the 5G SPL 2002 of the terminal performs a reordering procedure for ordering the sequence of data input through different links using the SPL SN (S2025). Accordingly, in a splitting scenario, unlike the path switching, it is always required to perform the reordering procedure.

If a specific condition is satisfied, the 5G SPL 2002 of the terminal may notify the 5G SPL 2012 of the base station of information on non-received SDUs through transmission of a switching status report to the 5G SPL 2012 of the base station. The triggering condition of the switching status report may be designated by the base station through information in a 5G RRC message, or may be operated through implementation of the terminal. It is also possible to operate a timer for the triggering or to periodically transmit the triggering. Specifically, the 5G SPL 2002 of the terminal triggers the switching status report (S2030), information on the non-received data (SDUs) is transferred from the 5G SPL 2002 to a 5G RRC 2000 (S2035), and the 5G RRC 2000 of the terminal transmits the switching status report to a 5G RRC 2014 of the base station (S2040). Thereafter, the 5G RRC 2014 of the base station transfers the switching status report or information on the non-received SDUs in the switching status report to the 5G SPL 2012 to perform the switching status report.

If the switching status report that is generated in any method is received, the base station 100 may retransmit the non-received SDUs of the terminal 110 from the 5G SPL 2012 to the 5G SPL 2002 of the terminal (S2050). Based on the retransmitted SDUs, the terminal may send the data upward through ordering of the SDU sequence.

Figure 21:
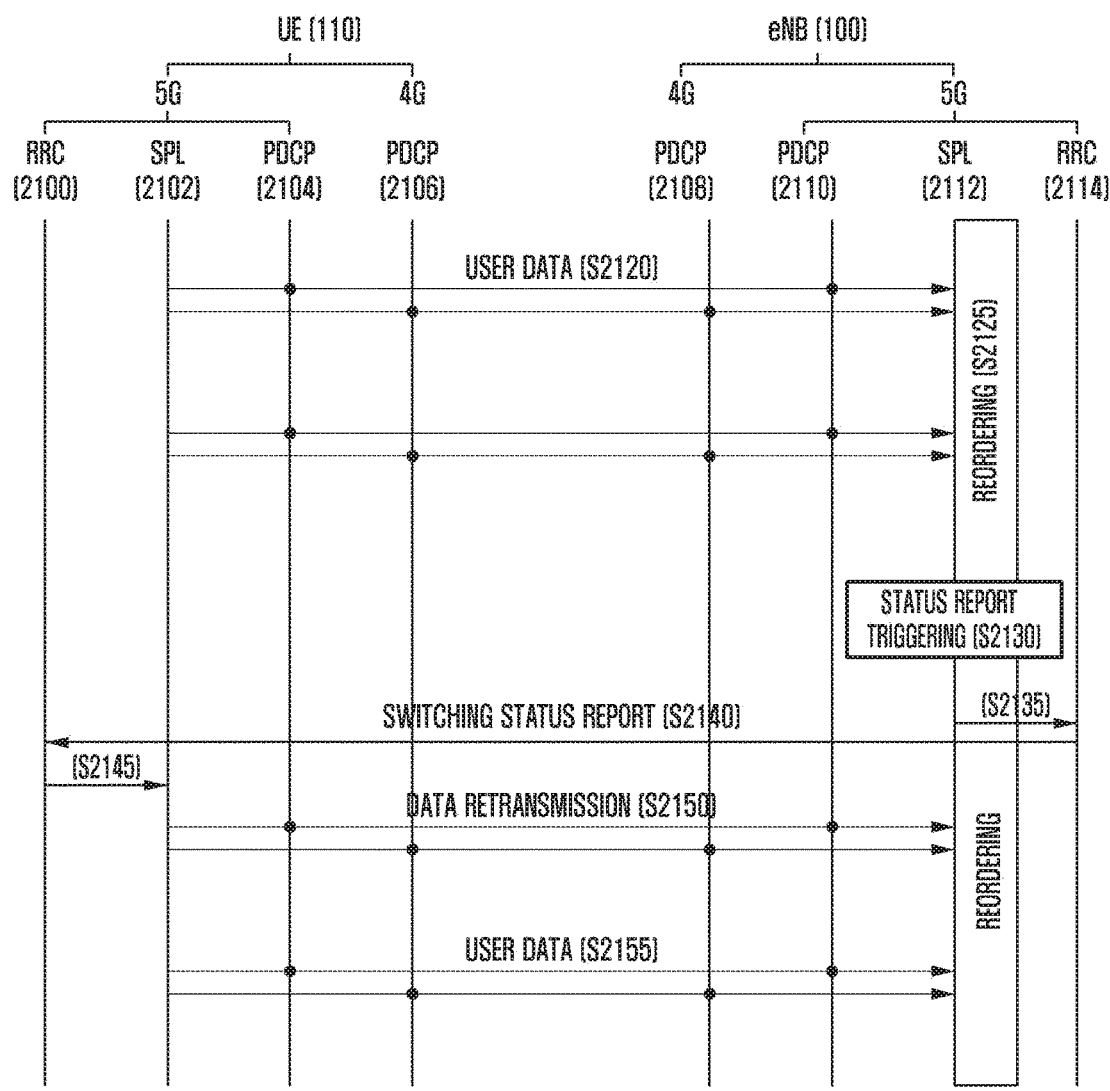
FIG. 21 is a diagram illustrating an example of a method for preventing a loss of uplink data when data path splitting, through which data is transmitted to both a 5G link and a 4G link, is performed according to an embodiment of the present disclosure.

FIG. 21 is a diagram illustrating an example of a method for preventing a loss of uplink data when data path splitting, through which data is transmitted to both a 5G link and a 4G link, is performed according to an embodiment of the present disclosure.

Referring to FIG. 21, a SWI/SPL performs only a splitting function, and is hereinafter described as SPL. If at least one link of a path that is split and transmitted is not valid anymore according to circumstances, a terminal (UE) 110 and a base station (eNB) 100 may operate to perform path switching like the above-described various embodiments. FIG. 21 illustrates a method for preventing a data loss using SN information of a header that includes the SN of the function as described above with reference to FIG. 15.

In FIG. 21, a path for transmitting user data from a 5G SPL 2102 of the terminal 110 to a 5G SPL 2112 of the base station 100 through a 5G PDCP 2104 of the terminal and a 5G PDCP 2110 of the base station and a path for transmitting user data from the 5G SPL 2102 of the terminal to the 5G SPL 2112 of the base station through a 4G PDCP 2106 of the terminal and a 4G PDCP 2108 of the base station coexist (S2120). In this case, the 5G SPL 2112 of the base station performs a reordering procedure for ordering the sequence of data input through different links using the SPL SN (S2125). Accordingly, in a splitting scenario, unlike the path switching, it is always required to perform the reordering procedure.

The 5G SPL 2112 of the base station may notify the 5G SPL 20102 of the terminal of information on non-received SDUs through transmission of a switching status report to the 5G SPL 2102 of the terminal. The triggering condition of the switching status report may be operated under the determination of the base station or under a predefined condition. It is also possible to operate a timer for the triggering or to periodically transmit the triggering. Specifically, the 5G SPL 2112 of the base station triggers the switching status report (S2130), information on the non-received data (SDUs) is transferred from the 5G SPL 2112 to a 5G RRC 2114 (S2135), and the 5G RRC 2114 of the base station transmits the switching status report to a 5G RRC 2100 of the terminal (S2140). Thereafter, the 5G RRC 2100 of the terminal transfers the switching status report or information on the non-received SDUs in the switching status report to the 5G SPL 2102 to perform the switching status report.

If the switching status report that is generated in any method is received, the terminal 110 may retransmit the non-received SDUs of the terminal 110 from the 5G SPL 2102 to the 5G SPL 2112 of the base station. Based on the retransmitted SDUs, the base station may send the data upward through ordering of the SDU sequence.

Figure 22:
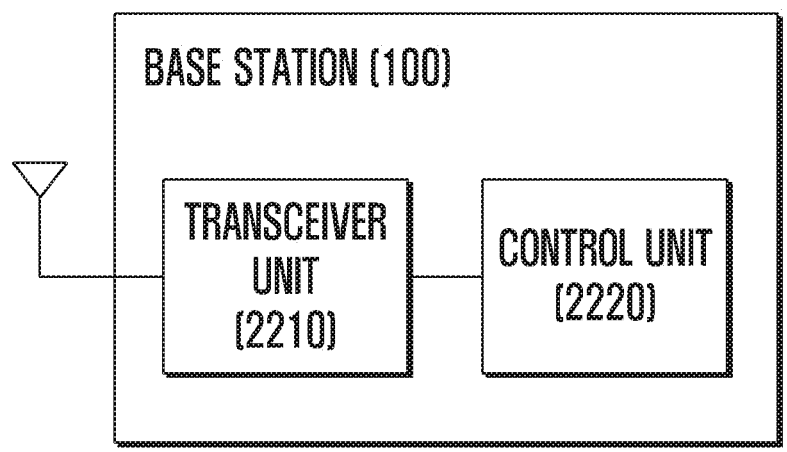
FIG. 22 is a block diagram illustrating a structure of a base station 100 according to an embodiment of the present disclosure.

FIG. 22 is a block diagram illustrating the structure of a base station 100 according to an embodiment of the present disclosure.

Referring to FIG. 22, the base station 100 may be composed of a transceiver unit 2210 and a control unit 2220. The transceiver unit 2210 may transmit and receive signals with a terminal 110, and such signals may include a message for a path switching operation, a switching status report, switching status report triggering, and data. The control unit 2220 may operate to carry out the various embodiments as described in FIGS. 8 to 12, and 14 to 21. As an example, referring to FIG. 8, the control unit 2220 may control a 5G RRC 814 to transmit PDCP status report triggering (RRC IE) to the terminal via a 4G PDCP 808, and may control the 5G RRC 814 to transfer a PDCP status report to a 5G SWI 812. Further, the control unit 2220 may control the 5G SWI 812 to transfer data that is not received by the terminal to the 4G PDCP 808, and may control the 4G PDCP 808 to transmit the data to the terminal.

Figure 23:
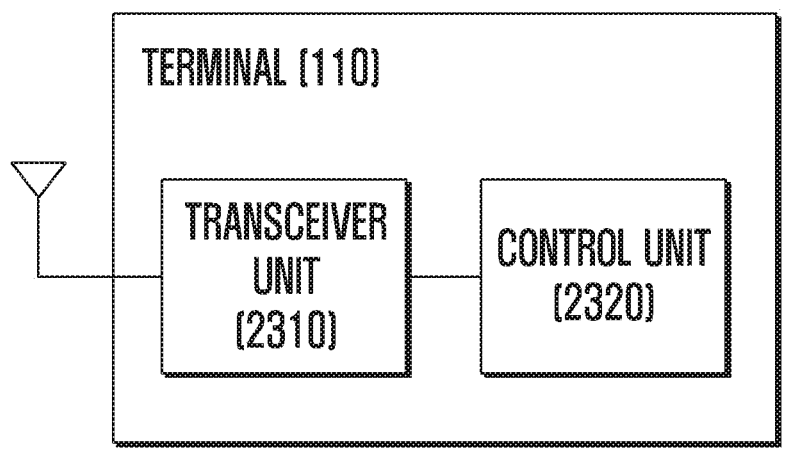
FIG. 23 is a block diagram illustrating a structure of a terminal 110 according to an embodiment of the present disclosure.

FIG. 23 is a block diagram illustrating the structure of a terminal 110 according to an embodiment of the present disclosure.

Referring to FIG. 23, the terminal 110 may be composed of a transceiver unit 2310 and a control unit 2320. The transceiver unit 2310 may transmit and receive signals with a base station 100, and such signals may include a message for a path switching operation, a switching status report, switching status report triggering, and data. The control unit 2320 may operate to carry out the various embodiments as described in FIGS. 8 to 12, and 14 to 21. As an example, referring to FIG. 8, the control unit 2320 may receive a PDCP status report triggering message (RRC IE) via a 4G PDCP 806, and may control a 5G RRC 800 to transfer the PDCP status report triggering message to a 5G PDCP 804. Further, the control unit 2320 may control the 5G PDCP 804 to generate and transfer a PDCP status report to the 5G RRC 800 and a 5G SWI 802, may control the 5G RRC 800 to transmit a switching status report (RRC message) to the base station via a 4G PDCP 806, and may control the 4G PDCP 804 to receive the data.

Figure 24:
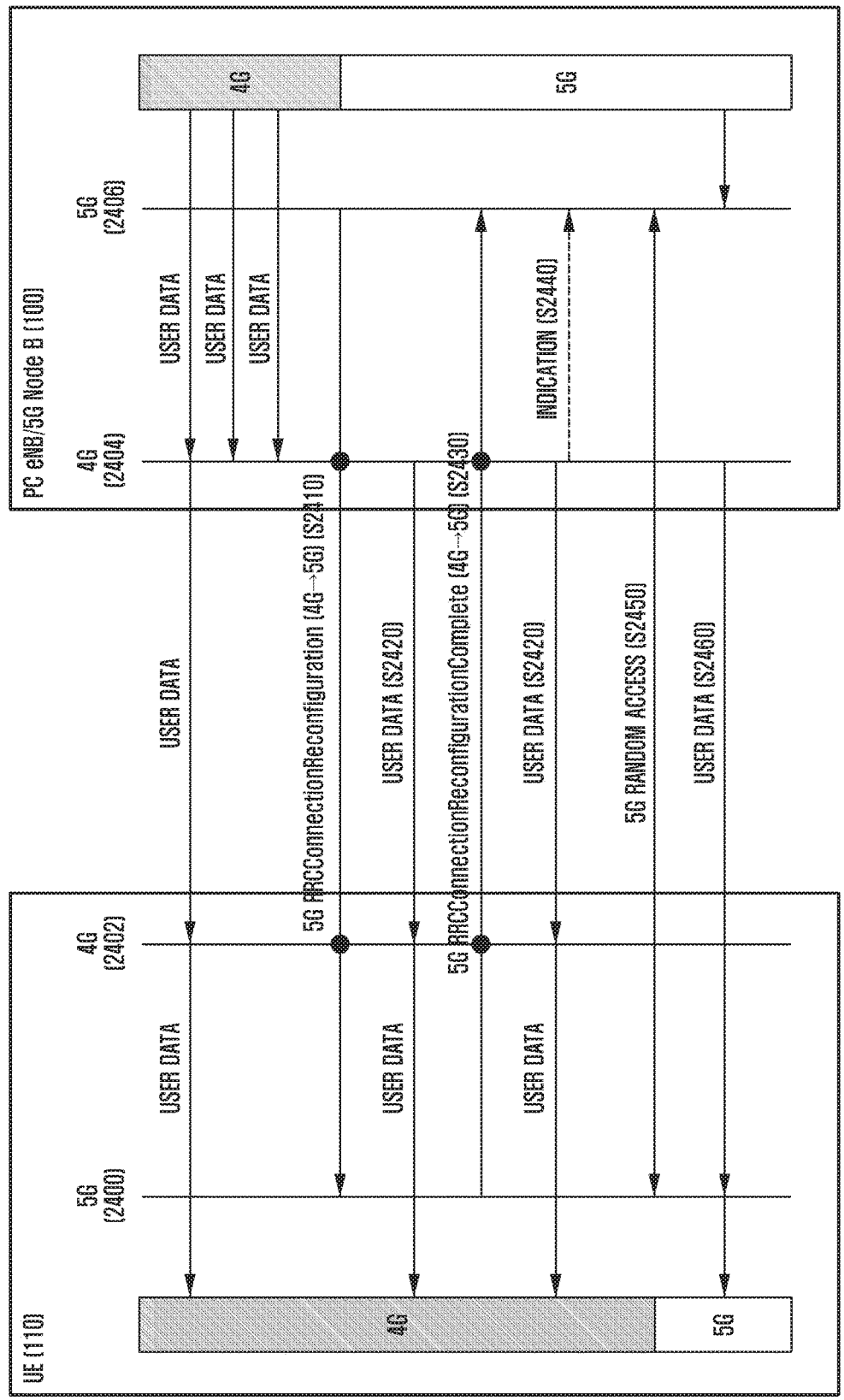
FIG. 24 is a diagram illustrating an example of a method for preventing a loss of downlink data when data path switching is performed from a 4G link to a 5G link according to an embodiment of the present disclosure.

FIG. 24 is a diagram illustrating still another example of a method for preventing a loss of downlink data when data path switching is performed from a 4G link to a 5G link according to an embodiment of the present disclosure.

Referring to FIG. 24, a 5G layer 2400 in a terminal (UE) 110 may mean a 5G RRC, 5G PDCP, or 5G SWI. A 4G layer 2402 may mean a 4G RRC or 4G PDCP. Further, a 5G layer 2406 in a base station (eNB) 100 may mean a 5G RRC, 5G PDCP, or 5G SWI. A 4G layer 2404 may mean a 4G RRC or 4G PDCP.

Since a 4G link is first used for data communications, user data is transmitted from the base station to the terminal through a 4G link. Thereafter, if it is decided to switch a data path from the 4G link to a 5G link, the 5G RRC 2406 of the base station transmits an RRCConnectionReconfiguration message to the 5G RRC 2400 of the terminal (S2410). If the RRCConnectionReconfiguration message is transmitted, the 5G SWI of the base station does not transmit downlink data to the 4G PDCP 2404 anymore. Even in this case, since it is estimated that the 4G link is yet reliable, the user data that remains in a buffer of the 4G PDCP 2404 of the base station may be transmitted to the terminal using the 4G link (S2420). Thereafter, the 5G RRC 2400 of the terminal transmits an RRCConnectionReconfigurationComplete message to the 5G RRC 2406 of the base station (S2430). Such a 5G RRCConnectionReconfiguration process may correspond to the path switching process of FIGS. 8 and 11.

Thereafter, if the base station senses that all user data has been transmitted through the 4G link through an RLC STATUS PDU (e.g., a PDCP buffer is empty and Negative Acknowledgement (NACK) has not been transmitted from the terminal), the 4G layer 2404 transmits an indication to the 5G SWI (5G PDCP) 2406 (S2440), and the base station starts to transmit the data to the 5G PDCP 2406. In this case, the terminal receives the user data through the 5G link, and thus in-sequence transmission can be secured.

Thereafter, the 5G layers 2400 and 2406 of the base station and the terminal perform 5G DRB setup process for performing a random access (S2450) for the 5G link, and transmit the downlink data using the 5G link after the DRB setup (S2460).

In this case, it is assumed that the SWI of the reception side (terminal) does not perform the switching function, but receives the user data from the 4G and 5G links to forward the received user data to the AP. This method enables lossless switching to be performed without changing the structure and the function of the terminal. In the case of uplink data transmission under the above assumption, an LTE chipset is not changed, and thus the indication from the 4G PDCP 2402 to the 5G SWI 2400 in the terminal becomes impossible.

Figure 25:
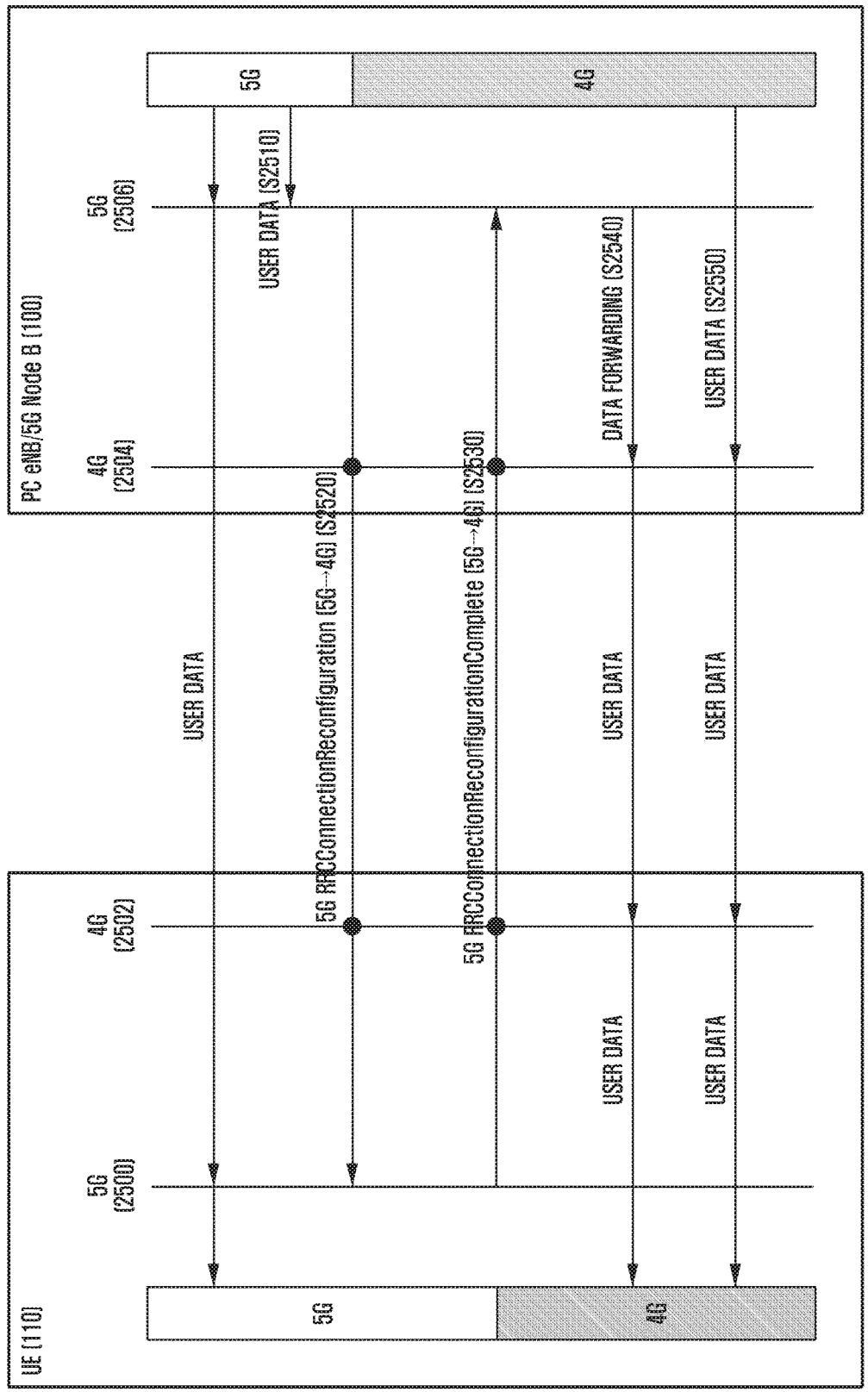
FIG. 25 is a diagram illustrating an example of a method for preventing a loss of downlink data when data path switching is performed from a 5G link to a 4G link according to an embodiment of the present disclosure.

FIG. 25 is a diagram illustrating still another example of a method for preventing a loss of downlink data when data path switching is performed from a 5G link to a 4G link according to an embodiment of the present disclosure.

Referring to FIG. 25, a 5G layer 2500 in a terminal (UE) 110 may mean a 5G RRC, 5G PDCP, or 5G SWI. A 4G layer 2502 may mean a 4G RRC or 4G PDCP. Further, a 5G layer 2506 in a base station (eNB) 100 may mean a 5G RRC, 5G PDCP, or 5G SWI. A 4G layer 2504 may mean a 4G RRC or 4G PDCP.

Since a 5G link is first used for data communications, user data is transmitted from the base station to the terminal through a 5G link. Thereafter, due to a poor quality of the 5G link, data path switching from the 5G link to a 4G link may be triggered. In this case, since the 5G link is unable to be used at the switching time, data forwarding and retransmission may be supported for lossless transmission. The user data that is transmitted through a 5G DRB is transferred to the 5G PDCP 2506 (S2510).

Thereafter, the 5G DRB is released, and the switching procedure is triggered through a 5G RRCConnectionReconfiguration message that is transmitted from the 5G RRC 2506 of the base station to the 5G RRC 2500 of the terminal (S2520). If the 5G RRCConnectionReconfiguration message is received, the terminal discards out-of-sequence PDCP SDUs. Thereafter, the 5G RRC 2500 of the terminal transmits a 5G RRCConnectionReconfigurationComplete message to the 5G RRC 2506 of the base station (S2530). Thereafter, for lossless transmission, the 5G PDCP 2506 of the base station forwards the user data after a data packet that has received the last ACK to the 4G PDCP 2504 (S2540). The 4G PDCP 2504 gives a 4G PDCP SN to the data packet and transmits PDCP PDUs. Thereafter, the base station transmits the user data using the 4G link (S2550). In this case, the lossless transmission can be secured, but redundant data transmission may occur.

In the case of applying the above-described method to the uplink transmission, data forwarding from the 5G PDCP 2500 to the 4G PDCP 2502 in the terminal becomes necessary. However, in the case of the current LTE chipset, since an interface that can transmit data from the 5G PDCP to the 4G PDCP does not exist, it may be difficult to apply the above-described method to the uplink transmission without changing the structure and the function of the current terminal.

Figure 26:
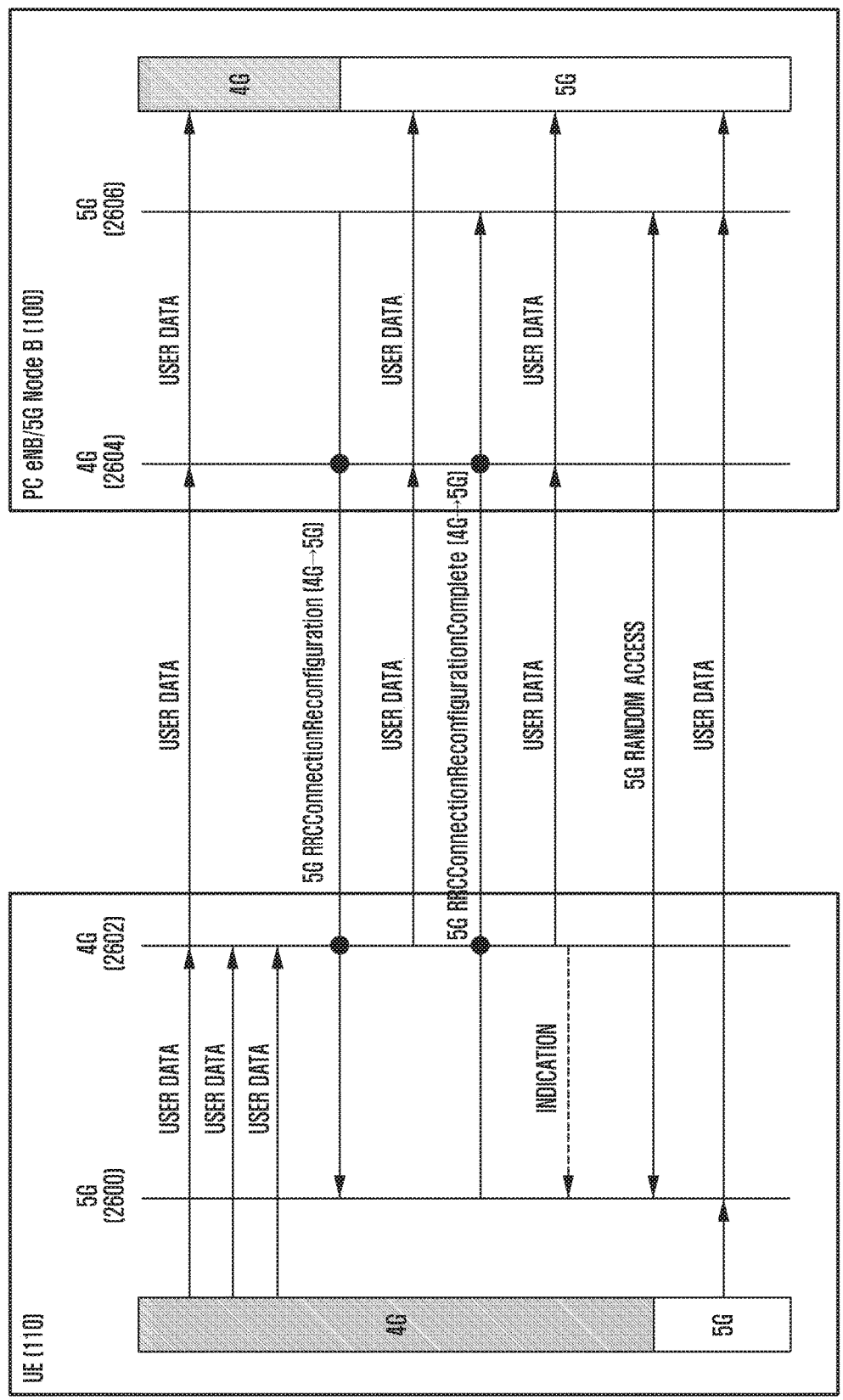
FIG. 26 is a diagram illustrating an example of a method for preventing a loss of uplink data when data path switching is performed from a 4G link to a 5G link according to an embodiment of the present disclosure.

FIG. 26 is a diagram illustrating still another example of a method for preventing a loss of uplink data when data path switching is performed from a 4G link to a 5G link according to an embodiment of the present disclosure.

The method that is disclosed in FIG. 26 is the same as the method for preventing a loss of downlink data of FIG. 24 except for the point that a transmission end and a reception end have been changed to each other. In order to perform the method of FIG. 26, it should be assumed that an indication from a 4G PDCP 2602 to a 5G SWI 2600 in a terminal is possible.

Figure 27:
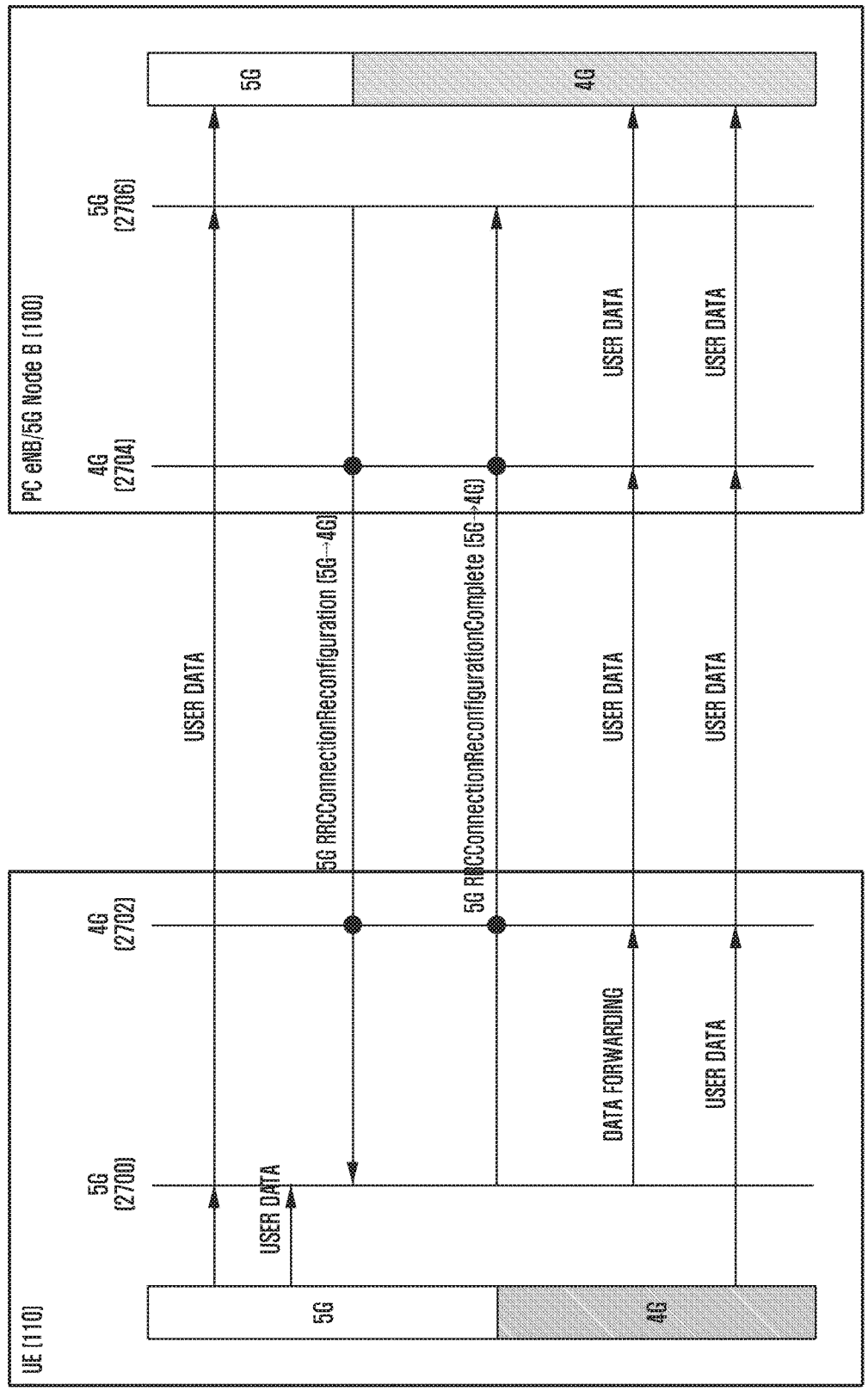
FIG. 27 is a diagram illustrating an example of a method for preventing a loss of uplink data when data path switching is performed from a 5G link to a 4G link according to an embodiment of the present disclosure.

FIG. 27 is a diagram illustrating still another example of a method for preventing a loss of uplink data when data path switching is performed from a 5G link to a 4G link according to an embodiment of the present disclosure.

The method that is disclosed in FIG. 27 is the same as the method for preventing a loss of downlink data of FIG. 25 except for the point that a transmission end and a reception end have been changed to each other. In order to perform the method of FIG. 27, since data forwarding from a 5G PDCP 2700 to a 4G PDCP 2702 in a terminal is necessary, an interface for the data forwarding operation should exist, and thus it is required to change the current terminal.

According to an embodiment of the present disclosure, it is possible to perform lossless data transmission even in the case of data path switching and data path splitting in an environment in which two different kinds of communication systems coexist.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a base station including a first entity and a second entity, the method comprising:
   transmitting, by the first entity, to a terminal, data in a transmission buffer using a fourth generation (4G) communication system, if a data transmission path is switched from the 4G communication system to a fifth generation (5G) communication system;
   identifying, by the first entity, whether or not the transmission buffer is empty; and
   transmitting, by the first entity, to the second entity, an indication indicating that the transmission buffer of the first entity is empty, if the transmission buffer of the first entity is empty.

2. The method of claim 1, wherein the indication is transmitted for in-sequence delivery in downlink.

3. The method of claim 1, further comprising:
   receiving, from the second entity, a message for notifying the data transmission path is switched from the 4G communication system to the 5G communication system on higher layer signaling,
   wherein the first entity is associated with the 4G communication system and the second entity is associated with the 5G communication system.

4. The method of claim 3, wherein data transmission from a switching (SWI) layer of the second entity to a packet data convergence protocol (PDCP) layer of the first entity is stopped by the SWI layer of the second entity, if the data transmission path is switched from the 4G communication system to the 5G communication system.

5. The method of claim 4, further comprising:
receiving a switching status report that includes information related to data packets that were not received by the terminal, if the data transmission path is switched from the 4G communication system to the 5G communication system;
retransmitting the data packets that were not received by the terminal;
transferring information related to the non-received data packets to the SWI layer of the second entity based on the switching status report that is received from the terminal; and
transferring the non-received data packets from the SWI layer of the second entity to a PDCP layer of the second entity if the data transmission path is switched from the 4G communication system to the 5G communication system.

6. The method of claim 1, further comprising:
receiving a switching status report that includes information related to data packets that were not received by the terminal, if the data transmission path is switched from the 4G communication system to the 5G communication system;
retransmitting the data packets that were not received by the terminal;
transferring information related to the non-received data packets to a switching (SWI) layer of the second entity based on the switching status report that is received from the terminal; and
transferring the non-received data packets from the SWI layer of the second entity to a packet data convergence protocol (PDCP) layer of the first entity if the data transmission path is switched from the 4G communication system to the 5G communication system.

7. The method of claim 1, further comprising:
transmitting, by the second entity, to the terminal, data using the second communication system in response to the receiving of the indication.

8. The method of claim 1, further comprising:
stopping, by a switching (SWI) layer, data transmission from the SWI layer to a packet data convergence protocol (PDCP) layer associated with the first entity, if the data transmission path is switched from the 4G communication system to the 5G communication system; and
transmitting, by the SWI layer, data to a PDCP layer associated with the second entity, if the data transmission path is switched from the 4G communication system to the 5G communication system.

9. A base station including a first entity and a second entity in a mobile communication system, the base station comprising:
a transceiver; and
a controller coupled with the transceiver and configured to:
control the transceiver to transmit, by the first entity, to a terminal, data in a transmission buffer using a fourth generation (4G) communication system, if a data transmission path is switched from the 4G communication system to a fifth generation (5G) communication system,
identify, by the first entity, whether or not the transmission buffer is empty, and
control the transceiver to transmit, by the first entity, to the second entity, an indication indicating that the transmission buffer of the first entity is empty, if the transmission buffer of the first entity is empty.

10. The base station of claim 9, wherein the indication is transmitted for in-sequence delivery in downlink.

11. The base station of claim 9,
wherein the controller is further configured to control the transceiver to receive, from the second entity, a message for notifying the data transmission path is switched from the 4G communication system to the 5G communication system on higher layer signaling, and
wherein the first entity is associated with the 4G communication system and the second entity is associated with the 5G communication system.

12. The base station of claim 11, wherein data transmission from a switching (SWI) layer of the second entity to a packet data convergence protocol (PDCP) layer of the first entity is stopped by the SWI layer of the second entity, if the data transmission path is switched from the 4G communication system to the 5G communication system.

13. The base station of claim 12, wherein the controller is further configured to:
control the transceiver to receive a switching status report that includes information related to data packets that were not received by the terminal, if the data transmission path is switched from the 4G communication system to the 5G communication system,
control the transceiver to retransmit the data packets that were not received by the terminal,
control the transceiver to transfer information related to the non-received data packets to the SWI layer of the second base station based on the switching status report that is received from the terminal, and
control the transceiver to transfer the non-received data packets from the SWI layer of the second base station to a PDCP layer of the second entity, if the data transmission path is switched from the 4G communication system to the 5G communication system.

14. The base station of claim 9, wherein the controller is further configured to:
control the transceiver to receive a switching status report that includes information related to data packets that were not received by the terminal, if the data transmission path is switched from the 4G communication system to the 5G communication system,
control the transceiver to retransmit the data packets that were not received by the terminal,
control the transceiver to transfer information related to the non-received data packets to a switching (SWI) layer of the second entity based on the switching status report that is received from the terminal, and
control the transceiver to transfer the non-received data packets from the SWI layer of the second entity to a packet data convergence protocol (PDCP) layer of the first entity, if the data transmission path is switched from the 4G communication system to the 5G communication system.

15. The base station of claim 9, wherein the controller is further configured to
control the transceiver to transmit, by the second entity, to the terminal, data using the second communication system in response to the receiving of the indication.

16. The base station of claim 9, wherein the controller is further configured to:
stop, by a switching (SWI) layer, data transmission from the SWI layer to a packet data convergence protocol (PDCP) layer associated with the first entity, if the data transmission path is switched from the 4G communication system to the 5G communication system; and control the transceiver to transmit, by the SWI layer, data to a PDCP layer associated with the second entity, if the data transmission path is switched from the 4G communication system to the 5G communication system.

* * * * *